(12) United States Patent
Hwang et al.

(10) Patent No.: US 10,754,455 B2
(45) Date of Patent: Aug. 25, 2020

(54) DISPOSITION STRUCTURE OF SENSOR OF ELECTRONIC DEVICE

(71) Applicant: Samsung Electronics Co., Ltd, Gyeonggi-do (KR)

(72) Inventors: Seunghyun Hwang, Gyeonggi-do (KR); Minyong Song, Gyeonggi-do (KR); Silkyu Lim, Gyeonggi-do (KR); Seungmin Choi, Gyeonggi-do (KR); Kwangtai Kim, Gyeonggi-do (KR); Hyungsup Byeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 15/268,474

(22) Filed: Sep. 16, 2016

(65) Prior Publication Data

US 2017/0212613 A1   Jul. 27, 2017

(30) Foreign Application Priority Data

Jan. 21, 2016   (KR) .................. 10-2016-0007451

(51) Int. Cl.
*G06F 3/041* (2006.01)
*G06F 1/16* (2006.01)

(52) U.S. Cl.
CPC ............ *G06F 3/041* (2013.01); *G06F 1/1626* (2013.01); *G06F 1/1643* (2013.01); *G06F 1/1684* (2013.01); *G06F 1/1686* (2013.01)

(58) Field of Classification Search
CPC ......... G06F 2203/04105; G06F 3/0412; G06F 3/0414; G06F 3/041–3/046; G06F 1/1643; G06F 1/1686; G06F 1/1684; G06F 1/1626; H04N 5/2257; H04N 5/2254; H04N 5/2256
See application file for complete search history.

(56) References Cited

U.S. PATENT DOCUMENTS

| 8,965,449 | B2 | 2/2015 | Alvarez Rivera et al. |
| 9,131,135 | B2 | 9/2015 | Jarvis et al. |
| 2004/0212555 | A1 | 10/2004 | Falco |
| 2008/0202824 | A1* | 8/2008 | Philipp .................. G06F 3/041 178/18.01 |

(Continued)

FOREIGN PATENT DOCUMENTS

KR   10-2015-0059470   6/2015

*Primary Examiner* — Temesghen Ghebretinsae
*Assistant Examiner* — Ivelisse Martinez Quiles

(57) ABSTRACT

An electronic device includes a housing including a first surface facing a first direction and a second surface facing a second direction opposite to the first direction; a transparent substrate forming at least a portion of the first surface; a display disposed between the transparent substrate and the second surface of the housing and including a third surface facing the first direction and a fourth surface facing the second direction; at least one sensor disposed between a portion of the second surface of the display and a portion of the second surface of the housing; an electrical structure disposed between the sensor and a portion of the second surface of the housing; and a control circuit electrically connected to the electrical structure, wherein the control circuit detects an electrical signal occurring by a pressure from the second direction to a portion of the transparent substrate using the electrical structure.

19 Claims, 27 Drawing Sheets

(56) References Cited

U.S. PATENT DOCUMENTS

| | | | |
|---|---|---|---|
| 2010/0088596 A1* | 4/2010 | Griffin | G06F 3/041 |
| | | | 715/702 |
| 2012/0200526 A1* | 8/2012 | Lackey | G06F 3/0414 |
| | | | 345/174 |
| 2013/0094126 A1* | 4/2013 | Rappoport | G02B 27/01 |
| | | | 361/679.01 |
| 2014/0129843 A1* | 5/2014 | Shi | G06F 21/32 |
| | | | 713/182 |
| 2014/0133715 A1* | 5/2014 | Ballard | G06F 3/0425 |
| | | | 382/124 |
| 2015/0296607 A1* | 10/2015 | Yang | G06F 3/00 |
| | | | 361/750 |
| 2017/0124370 A1* | 5/2017 | He | G06K 9/0012 |
| 2017/0193270 A1* | 7/2017 | Zhang | G02F 1/13338 |

\* cited by examiner

DISPOSITION STRUCTURE OF SENSOR OF ELECTRONIC DEVICE

CROSS-REFERENCE TO RELATED APPLICATION(S) AND CLAIM OF PRIORITY

The present application is related to and claims the benefit under 35 U.S.C. § 119(a) of a Korean patent application filed on Jan. 21, 2016 in the Korean intellectual property office and assigned Ser. No. 10-2016-0007451, the entire disclosure of which is hereby incorporated by reference.

TECHNICAL FIELD

The present disclosure relates to an electronic device, and more particularly, to a sensor disposition structure of an electronic device having a display and at least one sensor.

BACKGROUND

With the development of mobile communication technology and processor technology, a mobile terminal device (hereinafter, electronic device) has various functions as well as a conventional communication functions. In order to output an image generated according to various functions, the electronic device has a display including a touch panel and may output images such as various forms of applications, web browsers, and video contents on the display.

Further, in order to provide various experiences to a user, the electronic device can have various sensors such as a camera, proximity sensor, illumination sensor, fingerprint detection sensor, and bio sensor and may use a sensing value of each sensor.

For a physical contact with a portion of a user body or transmission of light, the sensors are exposed to the outside on a housing of the electronic device, and a conventional electronic device usually disposes sensors, for example, a home key, and a receiver, in an area other than an area in which the display is disposed at a front surface of the outside.

As the kinds of contents output through a display of an electronic device increases, a user may require a larger size of display. However, in order for the user to carry the electronic device, the electronic device has a restriction in a size; and as the electronic device has a restriction in a size, a display provided at a front surface of the electronic device must also have restriction in a size.

Given that a conventional electronic device disposes various sensors and a home key together with the display at a front surface thereof, when a size of the display is enlarged, the space that can dispose the various sensors and the home key are reduced to compensate and to keep the same total size from increasing.

SUMMARY

To address the above-discussed deficiencies, it is a primary object of the present disclosure to provide an electronic device of a structure that can extend or enlarge a size of a display by removing, relocating, or otherwise changing various sensors and a home key provided at a front surface of the electronic device.

In accordance with an embodiment of the present disclosure, an electronic device includes: a housing including a first surface facing in a first direction and a second surface facing in a second direction opposite to the first direction and including a transparent substrate forming at least a portion of the first surface thereof; a display disposed between the transparent substrate and the second surface of the housing and including a first surface facing in the first direction and a second surface facing in the second direction; at least one sensor disposed between at least a portion of the second surface of the display and at least a portion of the second surface of the housing; an electrical structure disposed between the at least one sensor and at least a portion of the second surface of the housing; and a control circuit electrically connected to the electrical structure, wherein the control circuit detects an electrical signal occurring or changing within the electrical structure by a pressure of the second direction to at least a portion of the transparent substrate using the electrical structure.

In accordance with another embodiment of the present disclosure, an electronic device includes: a housing including a first surface facing in a first direction and a second surface facing in a second direction opposite to the first direction and including a transparent substrate forming at least a portion of the first surface thereof; a display disposed between the transparent substrate and the second surface of the housing and including a first surface facing in the first direction and a second surface facing in the second direction; a camera device disposed between at least a portion of the second surface of the display and at least a portion of the second surface of the housing; a member separately disposed in the second direction from the camera device; an electrical structure disposed between the camera device and the member; and a control circuit electrically connected to the electrical structure, wherein the control circuit detects an electrical signal occurring or changing within the electrical structure by a change of a distance between the camera device and the member according to a movement in the second direction of the camera device using the electrical structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
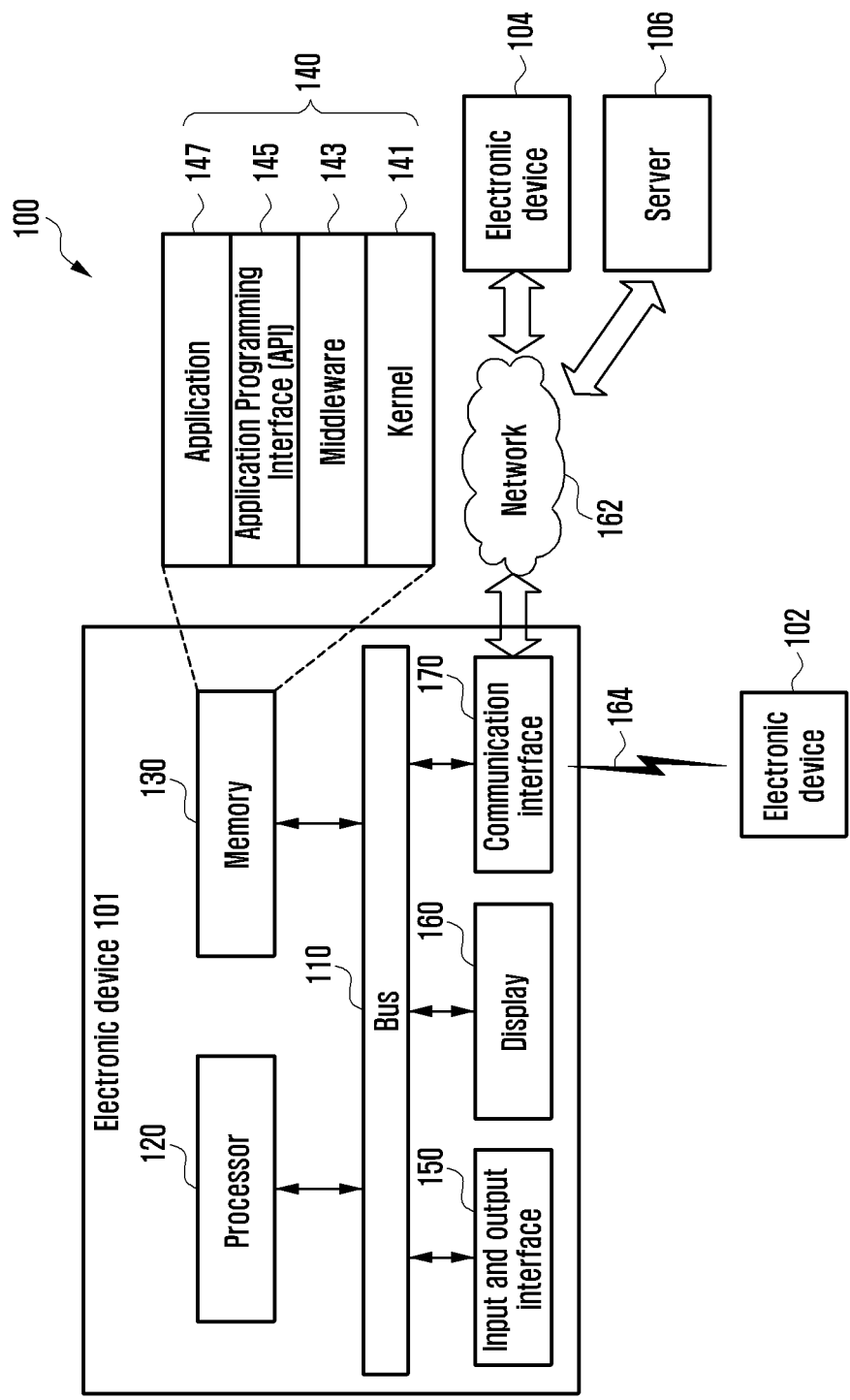
FIG. 1 is a block diagram illustrating an electronic device in a network environment according to various embodiments of the present disclosure.

FIGS. 1 through 13B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure are described in detail with reference to the accompanying drawings. While the present disclosure may be embodied in many different forms, various embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV®, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 is a block diagram illustrating an electronic apparatus according to an embodiment of the present disclosure.

Referring to FIG. 1, the electronic apparatus 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 164. The communication interface 170 can support short range communication protocols, e.g. a Wireless Fidelity® (WiFi) protocol, a BlueTooth® (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
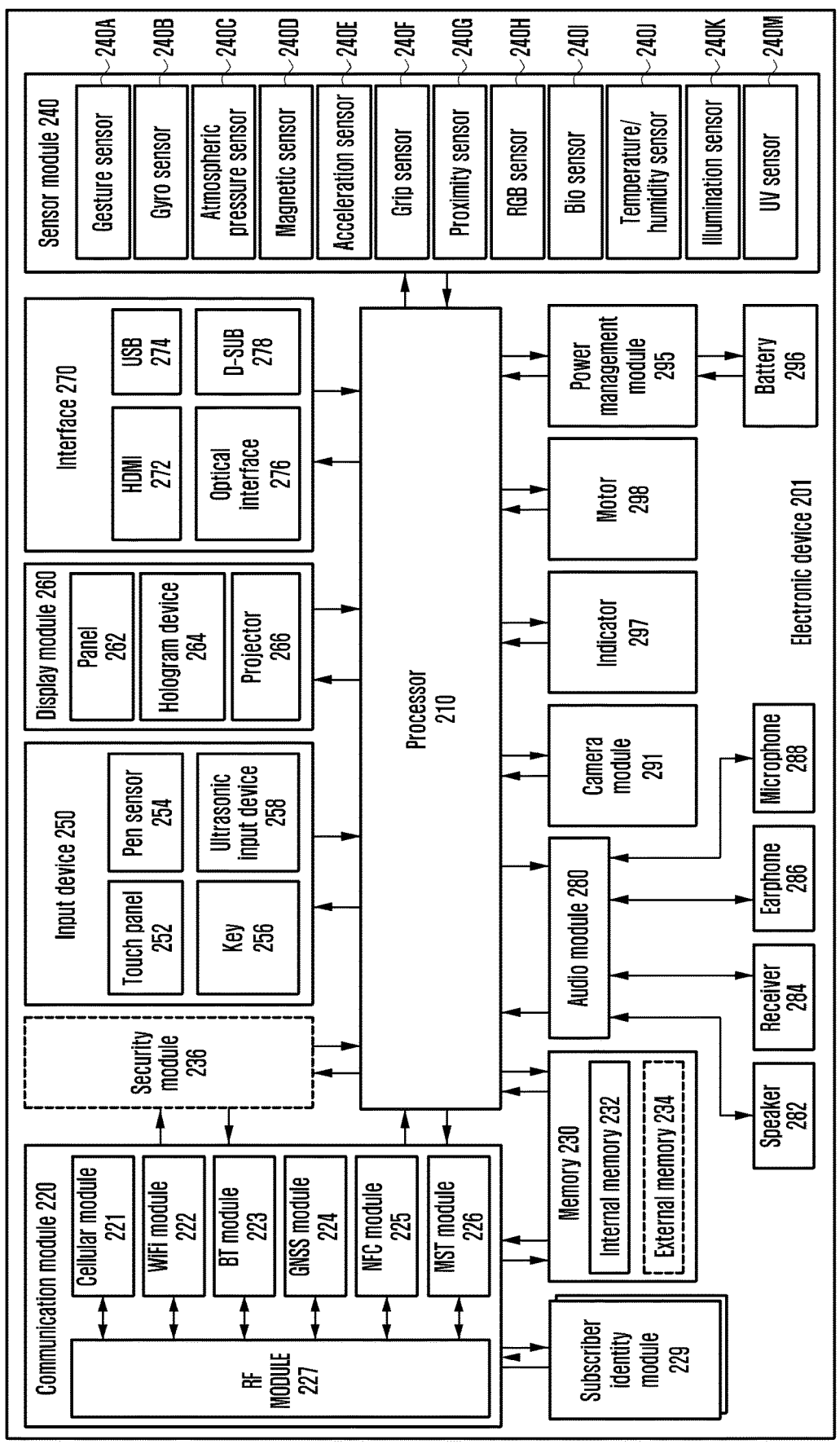
FIG. 2 is a block diagram illustrating a configuration of an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 260) may perform a data communication with any other electronic device (e.g., the electronic device 204 or the server 206) connected to the electronic device 201 through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include various other sensors (not shown), e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input device 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display module 260 may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 260 shown in FIG. 2. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), and various other sensors (not shown) for example, a lens, an ISP (Image Signal Processor), or a flash (e.g., LED or xenon lamp).

According to an embodiment, image information corresponding to a user's bio information (e.g., fingerprint) may be acquired through the camera module 291. The electronic device 201 may perform an authentication operation of the user's bio information (e.g., fingerprint) based on image information acquired through the camera module 291.

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and reduce or prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Figure 3:
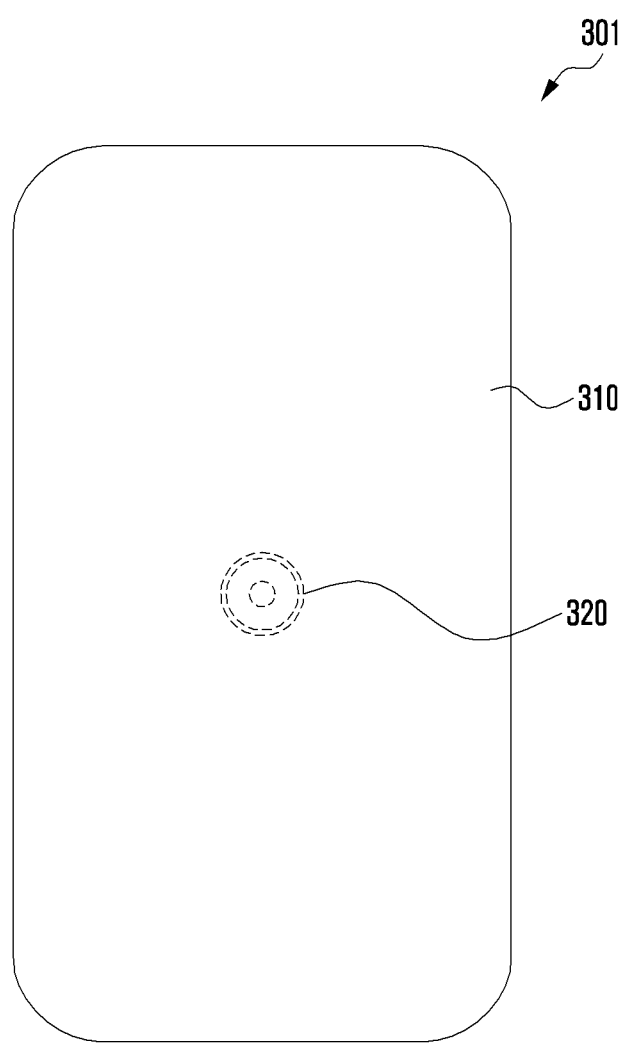
FIG. 3 is a diagram illustrating a front surface of an electronic device according to various embodiments of the present disclosure.

FIG. 3 is a diagram illustrating a front surface of an electronic device 301 according to various embodiments of the present disclosure.

Referring to FIG. 3, in an electronic device 301 according to various embodiments of the present disclosure, in a substantial entire area of a front surface, a display 310 may be disposed. In the electronic device 301 according to various embodiments of the present disclosure, in a portion of a front surface, the display 310 that removes a Black Matrix (BM) area in which a screen is not displayed and that covers an entire area and a left/right edge area of the front surface may be disposed. According to an embodiment, the electronic device 301 may include a front surface of a form in which an area that does not display a screen is not completely removed. For example, the electronic device 301 may include a BM area in which a width of a portion of an area that does not display a screen is 0.1 to 1 mm and in which a width of at least another portion is 1 mm to 5 mm.

By removing various keys or holes viewed to a user to the outside of the electronic device 301 according to a front cover structure of the display 310, an esthetic sense is provided to the user, and the widest display 310 can be used within a limited size of the electronic device 301.

As the display 310 has predetermined elasticity, when the user presses a portion of a transparent substrate provided at an upper end portion of the display 310, the portion may be bent in a rear surface direction of the electronic device 301.

According to various embodiments, at a rear surface of the display 310, at least one sensor 320 may be disposed. Here, at least one sensor 320 may receive external light, may include, for example at least one of a camera, proximity sensor, illumination sensor, fingerprint detection sensor, and bio sensor, and may include at least one of several sensors included in the sensor module 240 of FIG. 2. The sensor 320 may directly contact a rear surface of the display 310 or may contact a rear surface of the display 310 with another element interposed therebetween. Accordingly, in an area in which the sensor 320 is located, when the user presses the display 310 with a predetermined force or more, the sensor 320 may move in a rear surface direction.

FIG. 3 illustrates that the sensor 320 is disposed at a central portion of a rear surface of the display 310, but a location of the sensor 320 is not limited thereto and at an edge (e.g., a corner or an intermediate portion of the first side) of the display 310, the sensor 320 may be disposed. FIG. 3 illustrates only one sensor 320, but at a rear surface of the display 310, a plurality of sensors may be each disposed in a horizontal direction or may be layered in a vertical direction.

Figure 4:
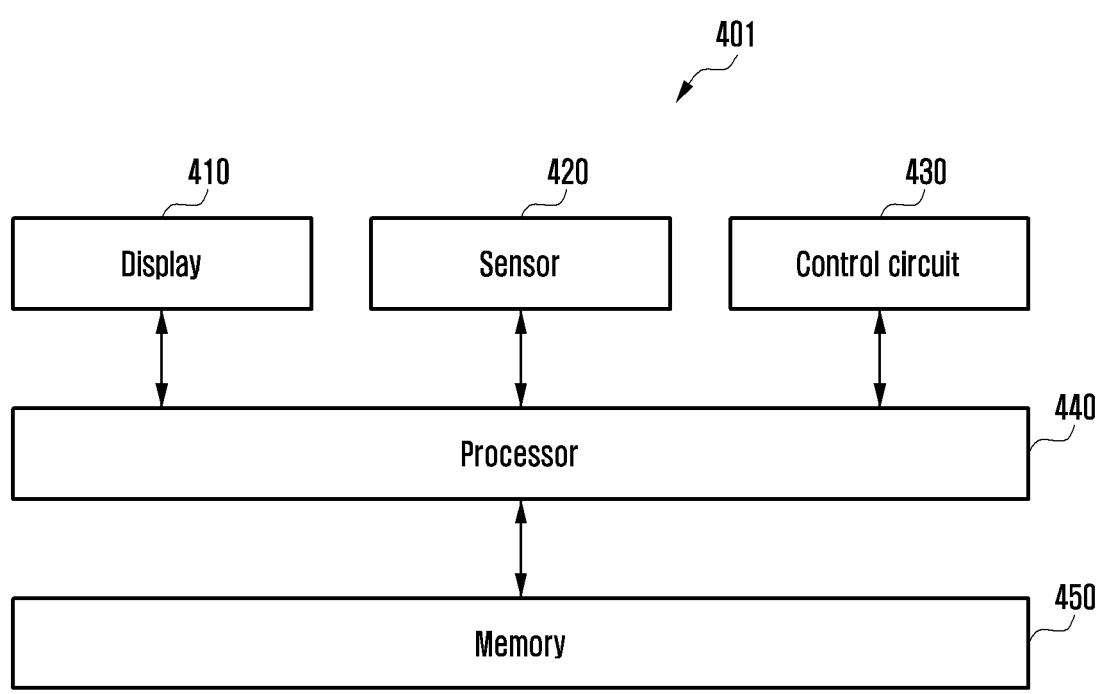
FIG. 4 is a block diagram illustrating a configuration of an electronic device according to various embodiments of the present disclosure.

FIG. 4 is a block diagram illustrating a configuration of an electronic device according to various embodiments of the present disclosure.

Referring to FIG. 4, an electronic device 401 includes a display 410, sensor 420, control circuit 430, processor 440, and memory 450, and even if at least a portion of shown elements is omitted or replaced, as needed, the elements may implement various embodiments of the present disclosure. According to various embodiments of the present disclosure, the electronic device 401 may further include at least some of elements of the electronic device 100 of FIG. 1 and/or the electronic device 201 of FIG. 2.

The electronic device 401 has a housing (not shown), and elements may be disposed within the housing. In at least a portion of a front surface of the housing, a transparent substrate (not shown) may be formed.

The display 410 displays an image, and as described with reference to FIG. 3, in an entire area of a front surface of the electronic device 401, the display 410 may be disposed. Hereinafter, the display 410 is implemented with an Organic Light Emitting Diode (OLED) display, but according to various exemplary embodiments of the present disclosure, any one of known other displays such as a Liquid Crystal Display (LCD), Light Emitting Diode (LED) display, Micro Electromechanical Systems (MEMS) display, and electronic paper display may be used. The display 410 is electrically connected to the processor 440 to receive an image signal from the processor 440 and outputs a screen according to the received signal. The display 410 may be disposed between a transparent substrate and a rear surface of the housing.

The electronic device 401 may include at least one the sensor 420, and the at least one sensor 420 may be a sensor that receives external light, such as a camera, proximity sensor, illumination sensor, fingerprint detection sensor, or bio sensor. As described with reference to FIG. 3, the sensor 420 may be disposed between a rear surface of the display 410 and a rear surface of the housing.

According to various exemplary embodiments of the present disclosure, a predetermined electrical structure (not shown) may be disposed between a rear surface of the sensor 420 and at least a portion of a rear surface of the housing. When the user applies a pressure from an upper end portion of the sensor 420 to a transparent substrate of the housing, the sensor 420 moves in a rear surface direction of the electronic device 401 according to bending of the display 410, and the electrical structure may detect such a movement of the sensor 420. As the display 410 is disposed at an entire area of a front surface of the electronic device 401, such an electrical structure may perform a function of a home key that should be removed. A more detailed example of the electrical structure will be described in detail later with reference to FIGS. 9A to 9E.

The control circuit 430 is electrically connected to the electrical structure, and by a pressure in a rear surface direction to at least a portion of a transparent substrate, the control circuit 430 may detect an electrical signal occurring or changing within the electrical structure. As the control circuit 430 is electrically connected to the processor 440, when the detected electrical signal occurs, the control circuit 430 may transmit the electrical signal to the processor 440.

The processor 440 may perform calculation or data processing for the control and/or communication of each element of the electronic device 401 and include at least some of elements of the processor 120 of FIG. 1 and/or the application processor 210 of FIG. 2. The processor 440 may be electrically connected to each of internal elements of the electronic device 401, such as the display 410, the sensor 420, the control circuit 430, and the memory 450.

The memory 450 may include a known volatile memory and nonvolatile memory and is not limited to a detailed implementation example. The memory 450 is electrically connected to the processor 440 and may store various instructions that may be performed in the processor 440. Such instructions may include a control instruction such as calculation and logic calculation, data movement, and input and output that may be recognized by the processor 440. By loading instructions stored at the memory 450, operations of the processor 440 to be described later may be performed.

According to various embodiments of the present disclosure, when the control circuit 430 detects an electrical signal occurring or changing within the electrical structure, the processor 440 may perform a predetermined function in response thereto. For example, in the conventional electronic device 401, by pressing a home key provided at a front surface, the processor 440 may convert a first screen displayed in the display 410 to a home screen. Here, the home screen may be a screen in which a plurality of icons corresponding to a plurality of applications are disposed.

Figure 5:
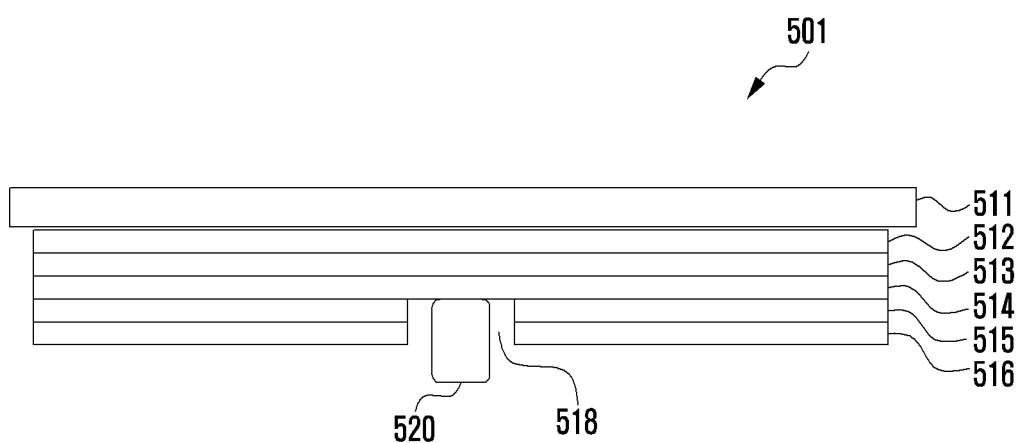
FIG. 5 is a diagram illustrating a side surface of a layered structure of an electronic device according to various embodiments of the present disclosure.

FIG. 5 is a diagram illustrating a side surface of a layered structure of an electronic device 501 according to various exemplary embodiments of the present disclosure.

In FIG. 5, an upper direction is a front surface direction of an electronic device 501, and a lower direction is a rear surface direction of the electronic device 501, and hereinafter, a front surface direction of the electronic device 501 may be referred to as a first direction and a lower direction thereof may be referred to as a second direction, and in each layered element, a surface located in a first direction may be referred to as a first surface, and a surface located in a second direction may be referred to as a second surface.

At a front surface of the housing, a transparent substrate 511 (or window) may be provided. The transparent substrate 511 is made of a transparent material to transmit light and may protect the display from an external impact. For example, the transparent substrate 511 may be formed with glass or a polymer film and may include at least one of polyimide Polyethylene Terephthalate (PET), and other polymer materials.

In a second direction of the transparent substrate 511, a polarizer layer 512 is provided, and in a second direction of the polarizer layer 512, a display upper plate 513 and a display lower plate 514 may be each provided. Although not shown, an organic light emitting diode and various electrical elements (e.g., transistor, gate wiring, data wiring, and capacitor) for driving the organic light emitting diode may be disposed between the display upper plate 513 and the display lower plate 514. In this case, because the transparent substrate 511, the polarizer layer 512, the display upper plate 513, and the display lower plate 514 may transmit at least some light, the user may recognize light occurring in the organic light emitting diode at the outside of the transparent substrate 511. The display upper plate 513 or the display lower plate 514 may be formed with a flexible polymer film, may include at least one of polyimide, PET, or other polymer materials, and may be formed with a double layer of a polyimide layer and a PET layer.

In a second direction of the display lower plate 514, a protective layer for protecting the display from an impact by an external pressure may be provided. The protective layer may include an impact absorption pattern layer 515 or a black layer 516. By elastically corresponding (or by pressing in a second direction and decompressing in a first direction) to an impact to a second direction occurring and transferred at the outside, the protective layers 515 and 516 may protect each element located in a first direction thereof. For example, the impact absorption pattern layer 515 may have an uneven surface, and the black layer 516 may be formed with at least one of black ink, sponge, and rubber. For example, the black layer 516 may block light emitted in a second direction from the display or may reflect light emitted in a second direction from the display in a first direction.

According to various embodiments of the present disclosure, the electronic device 501 may include a layer having an area 518 whose at least a portion is removed in a layered structure of the display, and in the removed area 518, at least a portion of a sensor 520 may be disposed. As described above, the sensor 520 may be a sensor 520 that receives external light, and when the sensor 520 is provided in a second direction of the impact absorption pattern layer 515 and the black layer 516 that do not transmit a predetermined rate or more of light, a light path to the corresponding sensor 520 may be at least partially blocked. Therefore, a layer having an area whose at least a portion is removed may be a layer (e.g., the impact absorption pattern layer 515 or the black layer 516) that does not transmit a predetermined rate or more of light.

As shown in FIG. 5, in the transparent substrate 511, the polarizer layer 512, the display upper plate 513, and the display lower plate 514 that can transmit a predetermined rate or more of light, a removed area does not exist, and in the impact absorption pattern layer 515 and the black layer 516 that do not transmit a predetermined rate or more of light, an area 518 whose at least a portion is removed may exist.

The display upper plate 513 and the display lower plate 514 may transmit most of applied light, but a transistor, gate wiring, and data wiring are provided therebetween to partially block or refract light. According to various embodiments of the present disclosure, at a rear surface of an entire area of the display, a pixel of an area in which the sensor 520 is located and a pixel of the remaining areas in which the sensor 520 is not located may be formed in different structures. This will be described in detail with reference to FIGS. 12A to 12C.

In FIG. 5, each of layered elements 511 to 516 is illustrated in a flat form, but according to an embodiment, each of the layered elements 511 to 516 is made of a flexible material and at least a portion (e.g., a side surface of the left side and the right side) thereof may have a bent form or may be bent.

Figure 6:
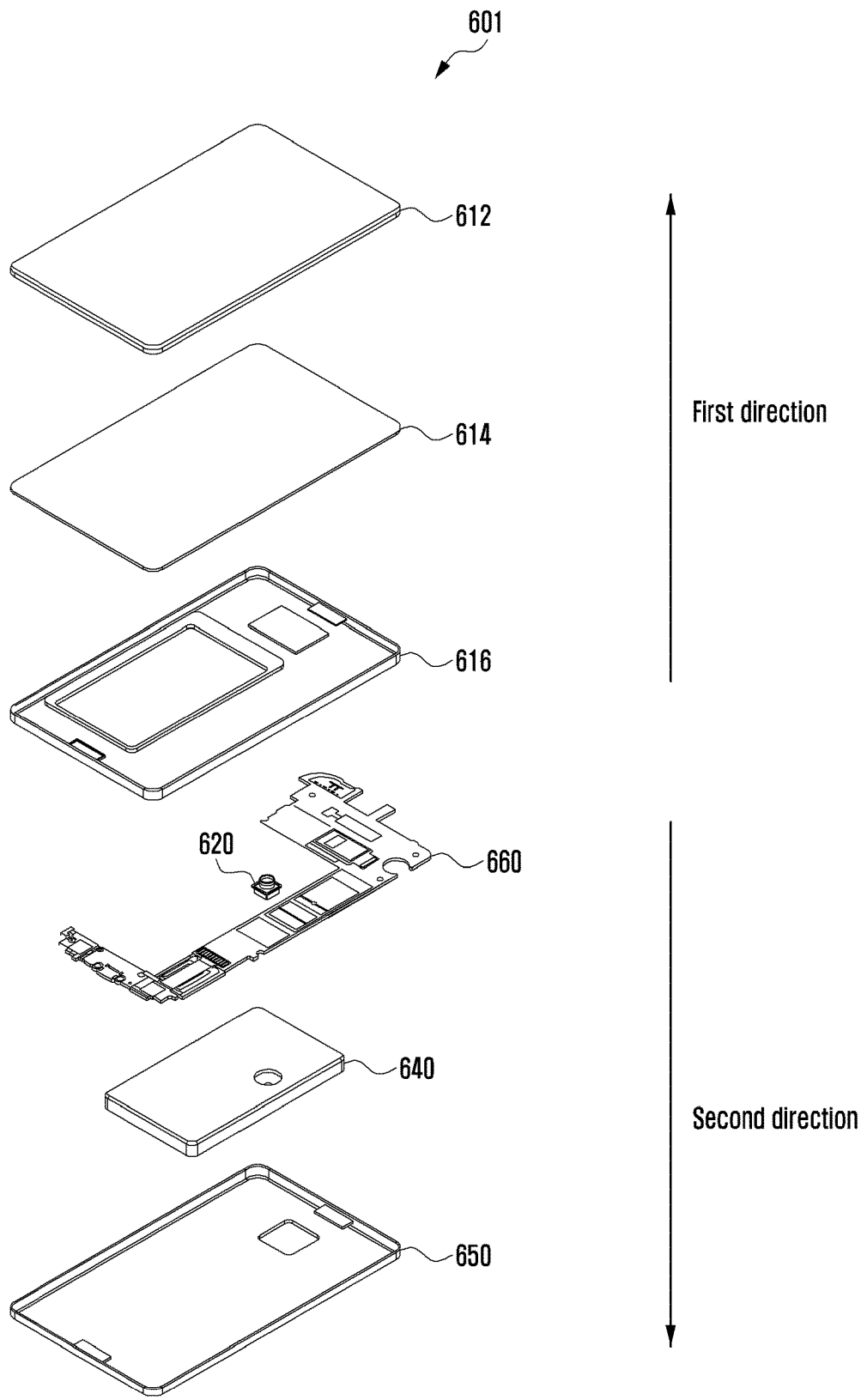
FIG. 6 is an exploded perspective view illustrating each separated layer constituting an electronic device according to various embodiments of the present disclosure.

FIG. 6 is an exploded perspective view illustrating each separated layer constituting an electronic device according to various embodiments of the present disclosure.

Referring to FIG. 6, an electronic device 601 includes a transparent substrate 612, display 614, bracket 616, battery 640, rear cover 650, and Printed Circuit Board (PCB) 660 and may be layered and assembled in shown order.

The bracket 616 and the rear cover 650 are assembled to form a housing, and in at least a portion of a first surface of the housing, the transparent substrate 612 may be included. The housing may house the display 614, the PCB 660, the battery 640, and a sensor 620 therein. Each element constituting the housing is made of at least one nonconductive material to not disturb electrical signal flow between elements within the housing.

The display 614 may include a touch screen panel. For example, the touch screen may be disposed between the transparent substrate 612 and the display 614. In this case, the touch screen may include at least one electrode layer, and the at least one electrode layer may be directly formed at a surface of a second direction of the transparent substrate 612 or a surface of a first direction of the display 614 or may be formed at a separate film (not shown) to be attached to the transparent substrate 612 or the display 614. For example, at least one electrode of the touch screen may be disposed within the display 614. In this case, at least one electrode may be disposed between an upper plate and a lower plate of the display 614 and may be disposed between electrodes formed to drive the display. Alternatively, at least one electrode of the touch screen may be integrally formed with a polarizer layer (e.g., the polarizer layer 512 of FIG. 5). The touch screen may use at least one method of capacitive, resistive, infrared ray method, or ultrasonic wave method.

The PCB 660 may mount various components on an insulating substrate, and for example, the processor 440, the memory 450, and the control circuit 430 of FIG. 4 may be mounted on the PCB 660 to be each electrically connected thereto. According to various embodiments, the control circuit may be provided on a driving circuit of the display 614 instead of being provided on the PCB 660.

The battery 640 is a known rechargeable battery and may be housed within the electronic device 601 or may be provided in a detachable form. FIG. 6 illustrates a form in which the battery 640 forms a hole in an intermediate portion and in which at least a portion of the sensor 620 is disposed within the hole, but it is not limited thereto, and various embodiments of a form in which the sensor 620 is disposed to detour the battery 640 and the PCB 660 are illustrated in FIGS. 11A to 11F.

The sensor 620 may be disposed between at least a portion of a second surface of the display 614 and the rear cover 650 (or a second surface of the housing).

Figure 7:
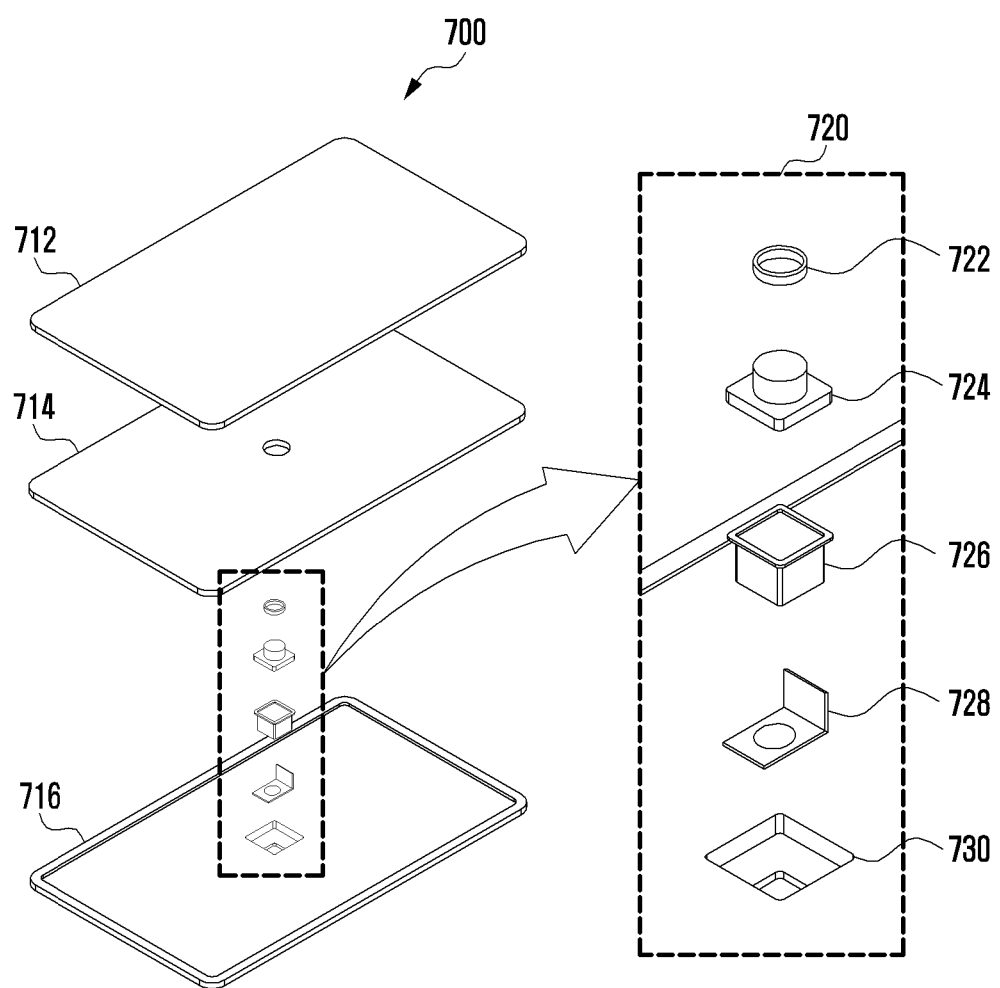
FIG. 7 is an exploded perspective view illustrating a structure of a sensor of an electronic device according to various embodiments of the present disclosure.

FIG. 7 is an exploded perspective view illustrating a structure of a sensor of an electronic device according to various embodiments of the present disclosure.

Referring to FIG. 7, a display is disposed under a transparent substrate, and the display may be divided into a transmitting layer 712 whose hole is not formed and a protective layer 714 whose hole is formed with removal of at least a partial area. Here, the transmitting layer 712 may include the polarizer layer 512, the display upper plate 513, and the display lower plate 514 of FIG. 5, and the protective layer 714 may include the impact absorption pattern layer 515 and the black layer 516.

According to various embodiments of the present disclosure, a sensor provided in at least a portion of a second surface of the display may be a camera 720. As shown in FIG. 7, the camera 720 may include a circular cover 722, lens barrel 724, and housing 726.

The lens barrel 724 includes a plurality of lenses therein and may be housed within the housing 726. A lens within the lens barrel 724 may be divided into a plurality of groups in at least one lens unit, and each group may move in a first direction or a second direction within the housing 726 according to zoon in or zoon out. Further, an image sensor such as a Charge Coupled Device (CCD) or a Complementary Metal-Oxide Semiconductor (CMOS) sensor may be provided within the lens barrel 724 and may perform a function of converting light entered through a plurality of lenses to an electrical signal.

The housing 726 may house the lens barrel 724, and in a first direction of the housing 726, the circular cover 722 may be assembled.

According to various embodiments of the present disclosure, in an area in which a layer disposed at a rear surface of the display and that does not transmit light of a predetermined rate or more is removed, because the camera 720 is disposed, at a front surface of the electronic device 700, the camera 720 may be viewed to the user. Therefore, in the electronic device 700, at a front surface of the circular cover 722 of the camera 720, a shutter (not shown) that may cover the camera 720 may be disposed, and the processor determines whether the camera 720 is executed to control opening and closing of the shutter. The shutter is provided with the same color as that of the protective layer 714 of the display, and when the shutter covers the camera 720, it may be viewed to the user as an entire area of the display is viewed.

In a second direction of the camera 720, a predetermined electrical structure 728 may be provided. When the user applies a pressure to the transparent substrate of the display, the sensor (or the camera 720) moves in a rear surface direction of the electronic device 700 according to bending of the display, and the electrical structure 728 may detect such a movement of the sensor (or the camera 720).

The camera 720 and the electrical structure 728 may be housed into the shown hole 730.

Figure 8A:
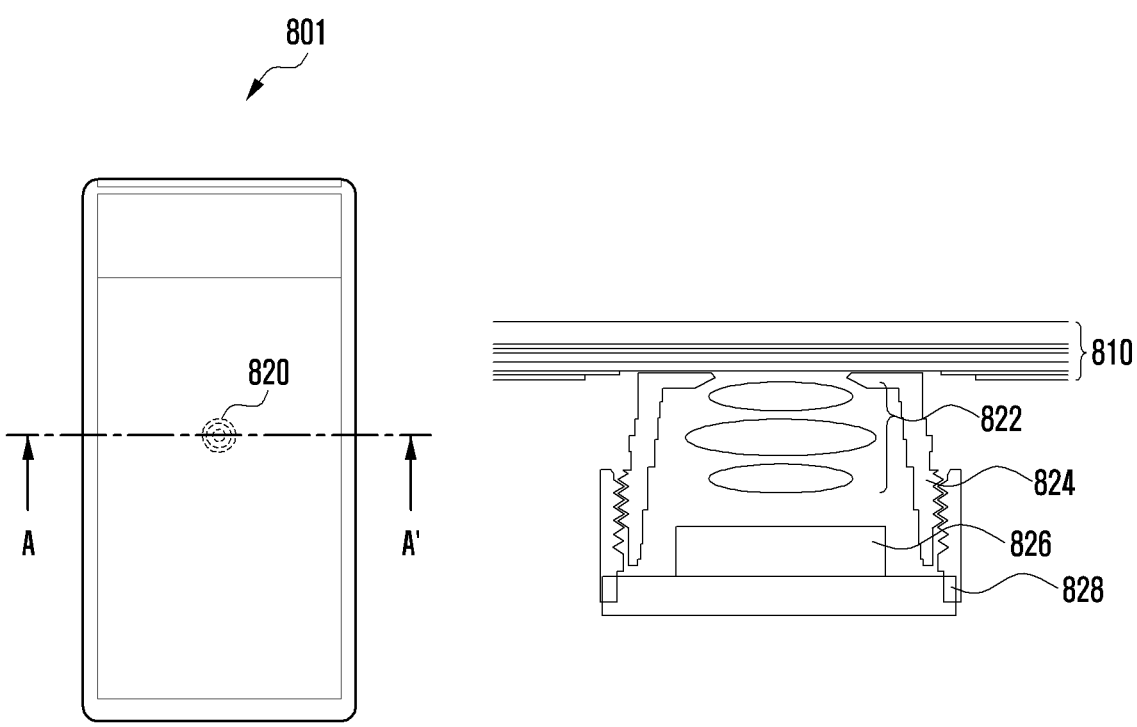
FIGS. 8A and 8B are diagrams illustrating a structure of a camera provided in an electronic device according to various embodiments of the present disclosure.
Figure 8B:
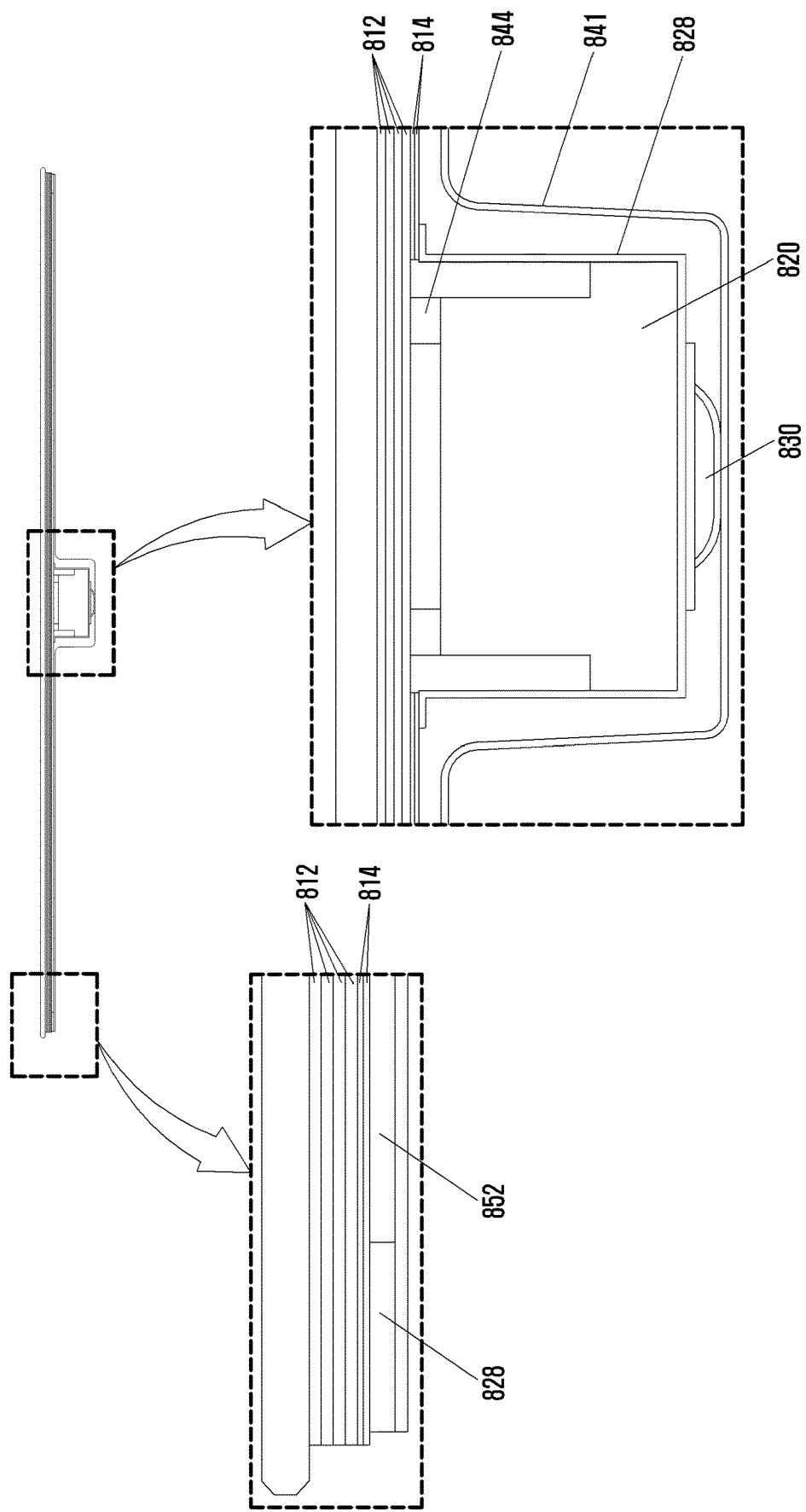

FIGS. 8A and 8B are diagrams illustrating a structure of a camera provided in an electronic device according to various embodiments of the present disclosure.

Referring to FIG. 8A, in a second direction of the display 810, a camera may be disposed.

A plurality of lenses 822 are included within a lens barrel 824 of the camera, and in a second direction of the plurality of lenses 822, an image sensor 826 may be disposed. The lens barrel 824 may be housed within a housing 828, the lens barrel 824 and the housing 828 are formed to engage with a sawtooth, and the barrel 824 may horizontally move in a first direction or a second direction, which is a light axis direction.

FIG. 8B illustrates a camera and an electrical structure in more detail.

When a layered structure of a display 810 is more enlarged, a transmitting layer 812 and a protective layer 814 are formed under a transparent substrate, and at least a partial area of the protective layer 814 is removed to house a portion of the camera, thereby forming a hole.

The housing 828 of the camera contacts at least a portion of a second surface of the protective layer 814, and when a pressure is applied in a second direction, the housing 828 may move in a second direction. In a second direction of the housing 828 of the camera, a dome key 830 may be disposed, and the dome key 830 may be pressed according to a movement of the housing 828 in a second direction. At the barrel 824 and an upper end portion of the barrel 824 within the housing 828, a cushion 844 for mitigating an impact to a second direction may be provided.

In a second direction of the dome key 830, a plate 841 is provided, and an air gap 853 may be formed between the plate 841 and the housing 828. Here, the plate 841 may be fixed despite a pressure within the electronic device 801, and the air gap 853 may distribute a repeated pressure applied to a central portion of the display 810 in which the dome key 830 is pressed.

FIGS. 9A to 9E are diagrams illustrating an electrical structure according to various embodiments of the present disclosure.

Referring to FIGS. 9A to 9E, an electronic device 901 according to an embodiment of the present disclosure includes an electrical structure disposed between a sensor 920 and at least a portion of a second surface of the housing, and the electrical structure may generate an electrical signal by a pressure of a second direction to at least a portion of a transparent substrate 912.

An electrical structure according to an embodiment of various embodiments of the present disclosure may include a conductive member 942 separated in a second direction from the sensor 920 and a conductive dome structure 940 disposed between at least a portion of the sensor 920 and at least a portion of the conductive member 942.

Figure 9A:
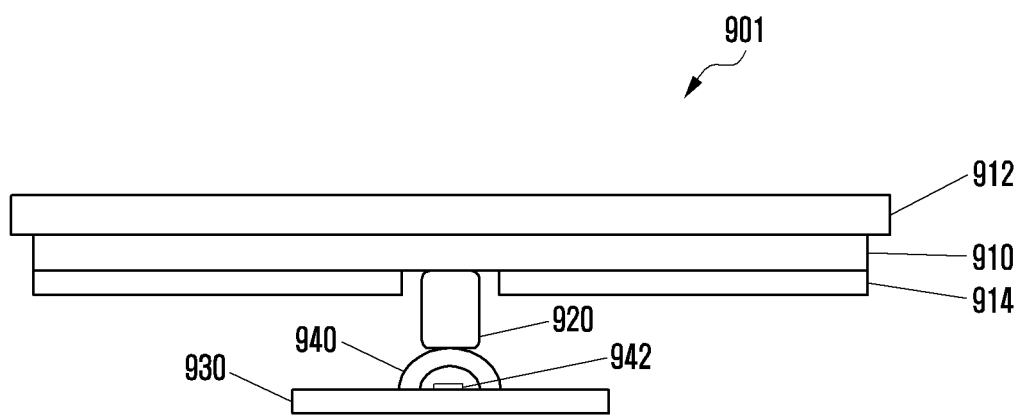
FIGS. 9A to 9E are diagrams illustrating an electrical structure according to various embodiments of the present disclosure.

As shown in FIG. 9A, the conductive dome structure 940 may have a convex form in a first direction, may be made of a flexible material, and may be pressed in a second direction according to a pressure to the second direction. The conductive member 942 may be fixed on a PCB 930 and may be electrically connected to the control circuit. The conductive member 942 and the conductive dome structure 940 may be made of a conductive material, and when the conductive member 942 and the conductive dome structure 940 physically contact, an electrical signal generates in the conductive member 942 and the control circuit may detect the electrical signal.

In a hole in which at least a portion of a protective layer 914 is removed, at least a portion of the sensor 920 may be disposed. A first surface of the sensor 920 may contact a display 910, and a second surface of an opposite direction may contact the conductive dome structure 940.

In a state in which a pressure is not applied in a second direction from the outside of the transparent substrate 912, the conductive dome structure 940 and the conductive member 942 are separated and thus an electrical signal does not occur. Thereafter, when a pressure is applied in a second direction from the outside of the transparent substrate 912, a pressure to the second direction is transferred to the sensor 920 via the display 910, and the sensor 920 may apply a pressure to a second direction to the conductive dome structure 940. When the applied pressure is a predetermined magnitude or more, at least a portion of the conductive dome structure 940 and at least a portion of the conductive member 942 contact and thus an electrical signal may occur.

The control circuit may detect an electrical signal generated by a contact between at least a portion of the conductive dome structure 940 and at least a portion of the conductive member 942.

According to another exemplary embodiment of various exemplary embodiments of the present disclosure, the electrical structure includes first electrodes 954a and 954b that at least partially contact with the sensor 920 and second electrodes 952a and 952b that at least partially contact with the first electrodes 954a and 954b, and the control circuit may detect a change of an amount of a current flowing through the first electrodes 954a and 954b and the second electrodes 952a and 952b as a change of an electrical signal.

Figure 9B:
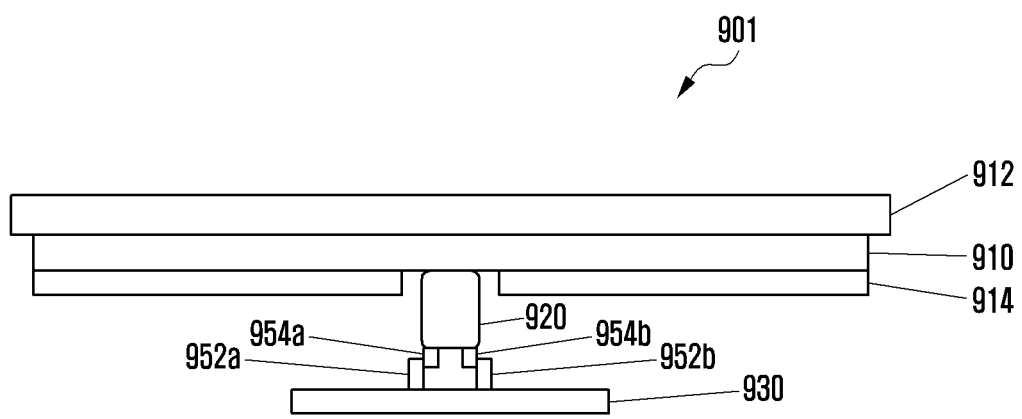

As shown in FIG. 9B, in a second direction of the sensor 920, the first electrodes 954a and 954b may be disposed, and in a first direction of the PCB 930, the second electrodes 952a and 952b may be disposed. FIG. 9B illustrates that the first electrodes 954a and 954b and the second electrodes 952a and 952b are each provided in two, but the number thereof is not limited thereto.

The first electrodes 954a and 954b and the second electrodes 952a and 952b are provided in parallel to increase a contact area of the first electrodes 954a and 954b and the second electrodes 952a and 952b in proportional to a distance in which the sensor 920 moves in a second direction. Further, as a contact area of the first electrodes 954a and 954b and the second electrodes 952a and 952b increases, an amount of a current flowing to the control circuit through the first electrodes 954a and 954b and the second electrodes 952a and 952b may increase.

In a state in which a pressure is not applied in a second direction from the outside of the transparent substrate 912, only a relatively narrow portion of the first electrodes 954a and 954b and the second electrodes 952a and 952b may contact. Thereafter, when a pressure is applied in a second direction from the outside of the transparent substrate 912, a pressure to the second direction is transferred to the sensor 920 via the display 910, and the first electrodes 954a and 954b may move also in a second direction according to a movement of the sensor 920. A contact area of the first electrodes 954a and 954b and the second electrodes 952a and 952b may increase according to a movement in a second direction of the first electrodes 954a and 954b. An amount of a current flowing to a control circuit increases according to increase of a contact area of the first electrodes 954a and 954b and the second electrodes 952a and 952b, and the control circuit may detect a change of an amount of the current. The control circuit may detect a change of resistance or a change of a voltage of at least a portion of the first electrodes 954a and 954b or the second electrodes 952a and 952b instead of a change of an amount of the current.

According to another embodiment of various embodiments of the present disclosure, an electrical structure may include a first electrode 962 and a second electrode 964 separately disposed from the first electrode 962, and the control circuit may detect a change of a capacitance formed between the first electrode 962 and the second electrode 964 as a change of an electrical signal.

Figure 9C:
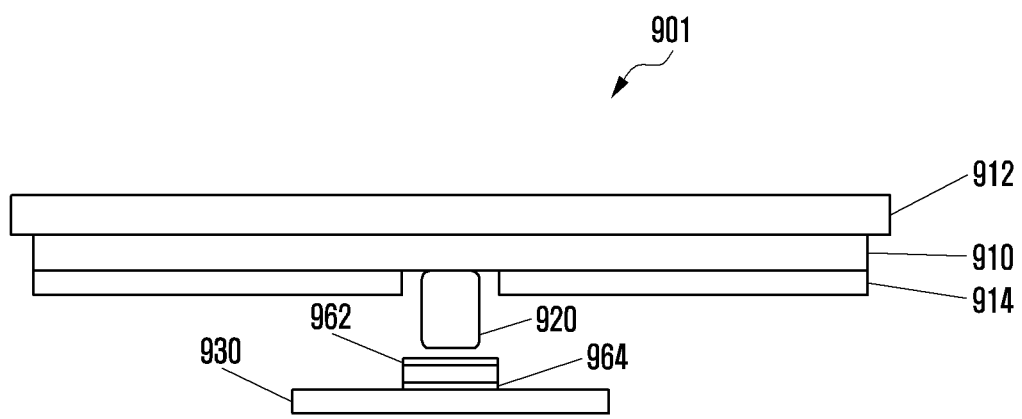

As shown in FIG. 9C, a capacitor having the first electrode 962 and the second electrode 964 may be provided between the sensor 920 and the PCB 930. The capacitor may be a piezoelectric element.

A capacitance of the capacitor may change according to a distance of the first electrode 962 and the second electrode 964 and may be inversely proportional to a distance of the first electrode 962 and the second electrode 964. Further, the first electrode 962 may move in a first direction or a second direction according to an applied pressure, and the second electrode 964 may be fixed.

In a state in which a pressure is not applied in a second direction from the outside of the transparent substrate 912, because the sensor 920 and the capacitor do not contact, a distance between the first electrode 962 and the second electrode 964 is maintained and thus a capacitance may be constantly maintained. When a pressure to the transparent substrate 912 occurs by a predetermined magnitude or more, the sensor 920 contacts the capacitor and thus the first electrode 962 may move in a second direction. Accordingly, a capacitance of the capacitor reduces, and the control circuit may detect a change of a capacitance as a change of an electrical signal.

According to another embodiment, the capacitor has only one electrode and may detect a capacitance formed between one electrode and the ground. In this case, an electrode may be disposed in a first direction, and the ground may be formed in a second direction. The ground may be electrically connected to, for example, the display or the PCB.

According to another embodiment of various embodiments of the present disclosure, an electrical structure 970 includes a light emitting structure 972a that emits light and a light receiving structure 972b that receives at least a portion of light emitted from the light emitting structure 972a, and the control circuit may detect a time in which light emitted from the light emitting structure 972a arrives at the light receiving structure 972b as a change of an electrical signal.

Figure 9D:
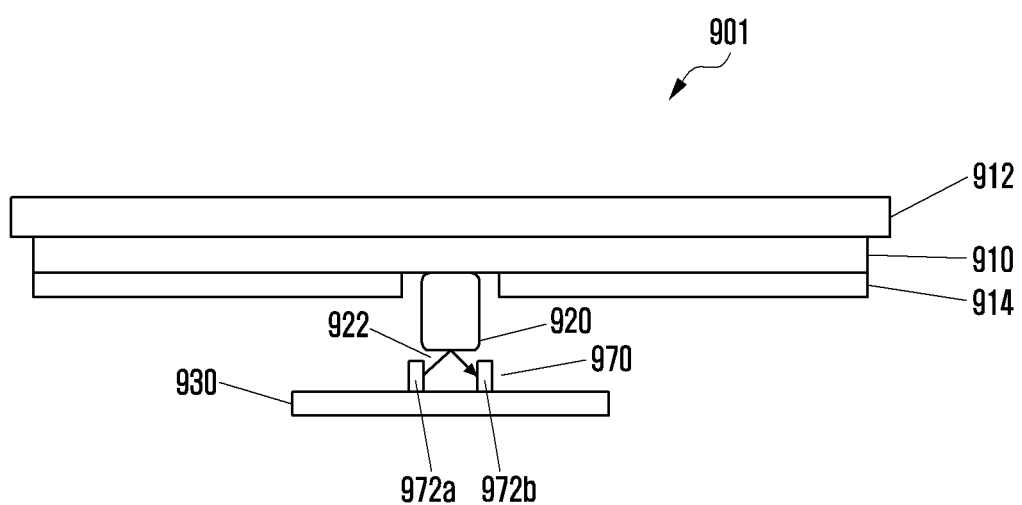

As shown in FIG. 9D, the light emitting structure 972a that emits light and the light receiving structure 972b that receives light may be disposed between the sensor 920 and the PCB 930. Further, in a second direction of the sensor 920, a reflection structure 922 that can reflect light is provided and thus light emitted from the light emitting structure 972a is reflected in the reflection structure 922 of the sensor 920 to be detected in the light receiving structure 972b.

The light emitting structure 972a may emit constant light according to a predetermined cycle, and the control circuit may detect a time in which light emitted from the light emitting structure 972a arrives at the light receiving structure 972b.

In a state in which a pressure is not applied in a second direction from the outside of the transparent substrate 912, because a distance between the sensor 920 and the light emitting structure 972a and the light receiving structure 972b is relatively large, a time in which light emitted from the light emitting structure 972a is reflected in the reflection structure 922 to arrive at the light receiving structure 972b may be relatively long. Thereafter, when the sensor 920 moves in a second direction according to a pressure to the transparent substrate 912, a distance between the reflection structure 922 and the light emitting structure 972a and the light receiving structure 972b of the sensor 920 becomes small and an arriving time of light may be shortened. The control circuit may detect whether the sensor 920 moves through a change of an arriving time of light.

According to another embodiment of various embodiments of the present disclosure, an electrical structure 980 includes a light emitting structure 982a that emits light and a light receiving structure 982b that receives at least a portion of light emitted from the light emitting structure 982a, and the control circuit may detect an amount of light emitted from the light emitting structure 982a and received in the light receiving structure 982b as a change of an electrical signal.

Figure 9E:
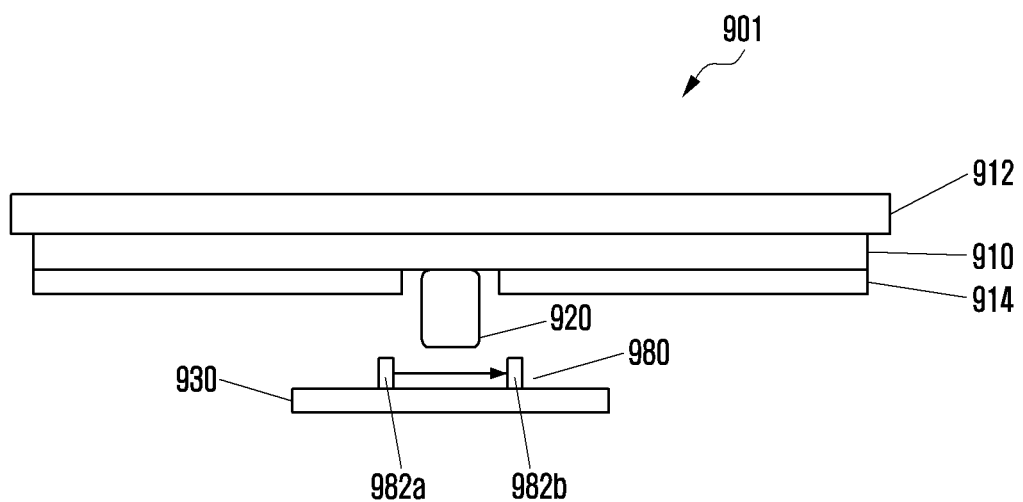

As shown in FIG. 9E, the light emitting structure 982a that emits light and the light receiving structure 982b that receives light may be disposed between the sensor 920 and the PCB 930. Unlike FIG. 9D, the light emitting structure 982a may emit light in a direction vertical to the light receiving structure 982b, and the sensor 920 may block a portion of light emitted from the light emitting structure 982a.

In a state in which a pressure is not applied in a second direction from the outside of the transparent substrate 912, the sensor 920 may not block light emitted from the light emitting structure 982a. Thereafter, when the sensor 920 moves in a second direction according to a pressure to the transparent substrate 912, the sensor 920 blocks a portion of light and thus an amount of light received in the light receiving structure 982b may be reduced. The control circuit may determine that a pressure occurs in a second direction according to reduction of an amount of light received in the light receiving structure 982b.

Figure 10:
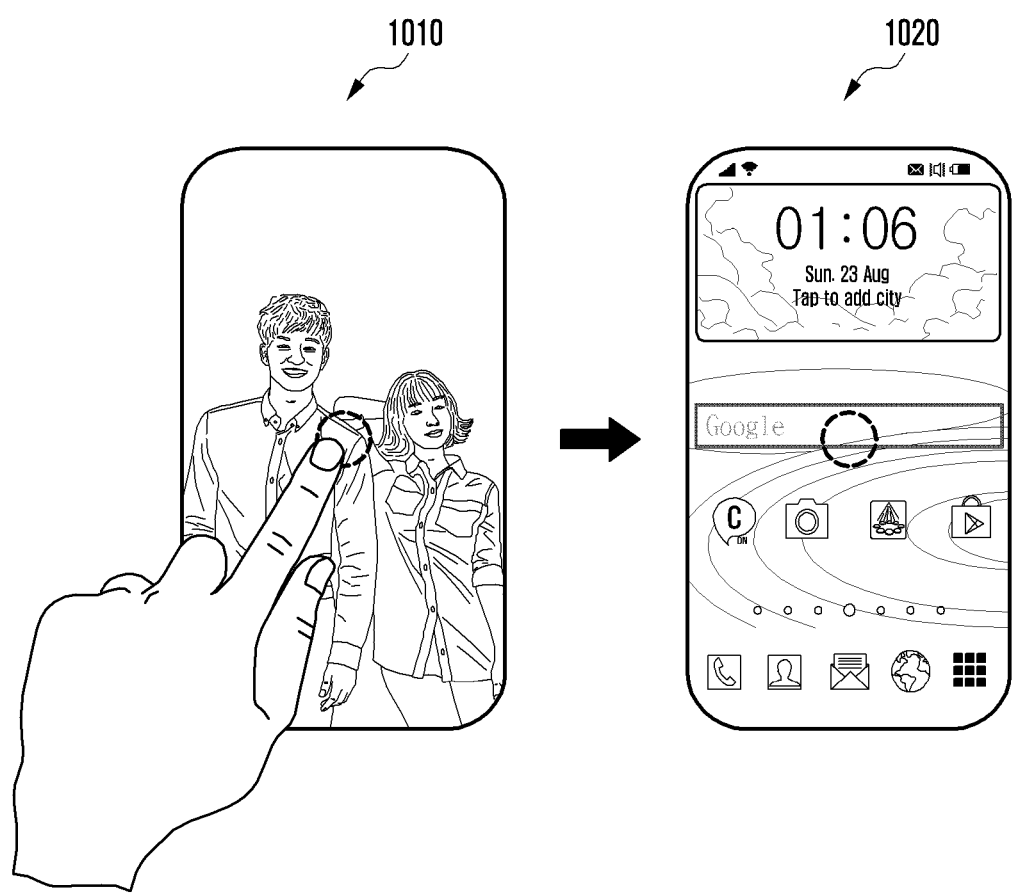
FIG. 10 is a diagram illustrating a screen change by a user's touch input according to various embodiments of the present disclosure.

FIG. 10 is a diagram illustrating a screen change by a user's touch input according to various embodiments of the present disclosure.

As described with reference to FIGS. 9A to 9E, a pressure of a second direction is detected by the control circuit through an electrical structure provided in a second direction of the sensor, and an electrical signal detected by the control circuit may be input to a processor.

The processor may perform a predetermined function to correspond to detection of an electrical signal. For example, in a conventional electronic device, by pressing a home key provided at a front surface, the processor may convert a first screen displayed in the display to a home screen (second screen). As shown in FIG. 10, in a state (first screen 1010) in which specific contents are reproduced, when the user presses an intermediate portion of the display in which the sensor is disposed by the finger, the processor may recognize an electrical signal occurring in the electrical structure and detected in the control circuit, and the processor may convert the first screen 1010 to a second screen 1020 in which a plurality of icons corresponding to a plurality of applications are disposed to correspond thereto.

According to various embodiments of the present disclosure, the electronic device may dispose the display in an entire area of a front surface, and a home key of an existing electronic device may be thus removed. However, a method of replacing a function of a home key that recognizes a physical pressure in an area of the outside of the electronic device by user experience is required, and various embodiments of the present disclosure include an electrical structure that disposes a sensor at a rear surface of the display and that recognizes a pressure at a rear surface of the sensor, and the electrical structure may replace a function of a home key.

According to various embodiments of the present disclosure, a display of an electronic device may include a touch screen, and by detecting a pressure to an area in which the sensor is located and detecting a touch to a touch screen, the touch screen may perform various control operations.

For example, when the user drags in an upper direction in a state that presses an area in which the sensor is located, a predetermined application may be executed, and when the user drags in a lower direction in a state that presses an area in which the sensor is located, a preset screen may be displayed.

FIGS. 11A to 11G are diagrams illustrating a disposition structure of a PCB, sensor, and battery within an electronic device according to various embodiments of the present disclosure.

As described above, the sensor is provided at a rear surface of the display, and even if a size of a sensor such as a camera, proximity sensor, illumination sensor, fingerprint detection sensor, and bio sensor is minimized, in order to dispose the sensor between a rear surface of the display and a rear surface of the housing, a predetermined space may be required. Accordingly, in the electronic device according to an embodiment of the present disclosure, by providing a predetermined space at the battery and/or the PCB, the sensor may be housed at the space.

Figure 11A:
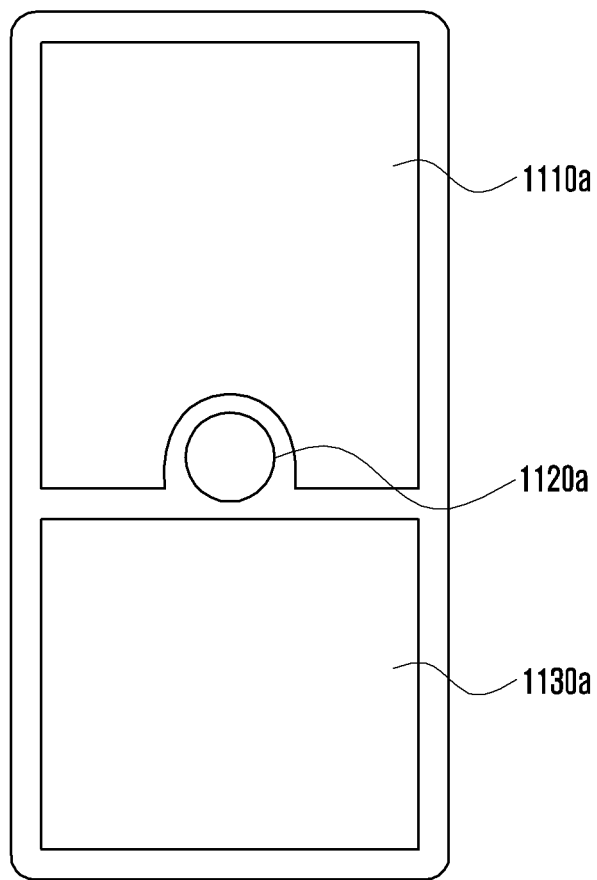
FIGS. 11A to 11G are diagrams illustrating a disposition structure of a Printed Circuit Board (PCB), sensor, and battery within an electronic device according to various embodiments of the present disclosure.

According to an embodiment of various embodiments, as shown in FIG. 11A, in the electronic device, by removing an area of a low portion of a PCB 1110a, at least a portion of a sensor 1120a and/or at least a portion of an electrical structure (e.g., the electrical structure 728 of FIG. 7) may be disposed.

Figure 11B:
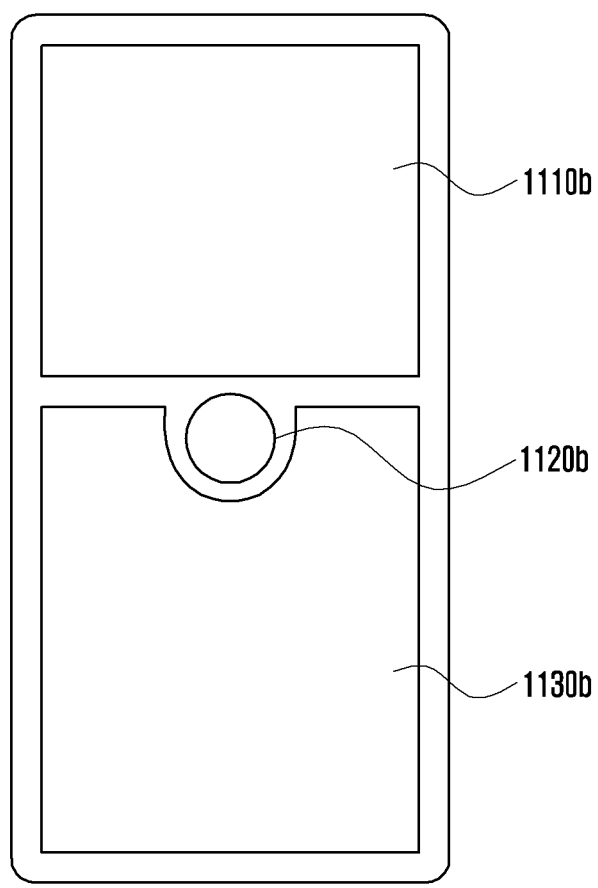

According to another embodiment, as shown in FIG. 11B, in the electronic device, by removing an area of an upper portion of a battery 1130b, at least a portion of a sensor 1120b and/or at least a portion of an electrical structure (e.g., the electrical structure 728 of FIG. 7) may be disposed.

Figure 11C:
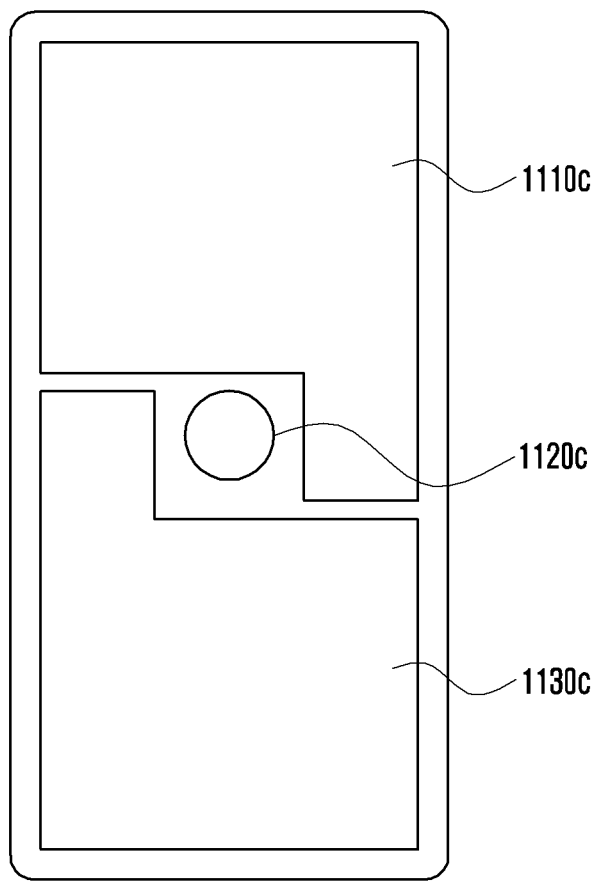

According to another embodiment, as shown in FIG. 11C, by removing each of an area of a low portion of a PCB 1110c and an area of an upper portion of a battery 1130c, at least a portion of a sensor 1120c and/or at least a portion of an electrical structure (e.g., the electrical structure 728 of FIG. 7) may be disposed.

Figure 11D:
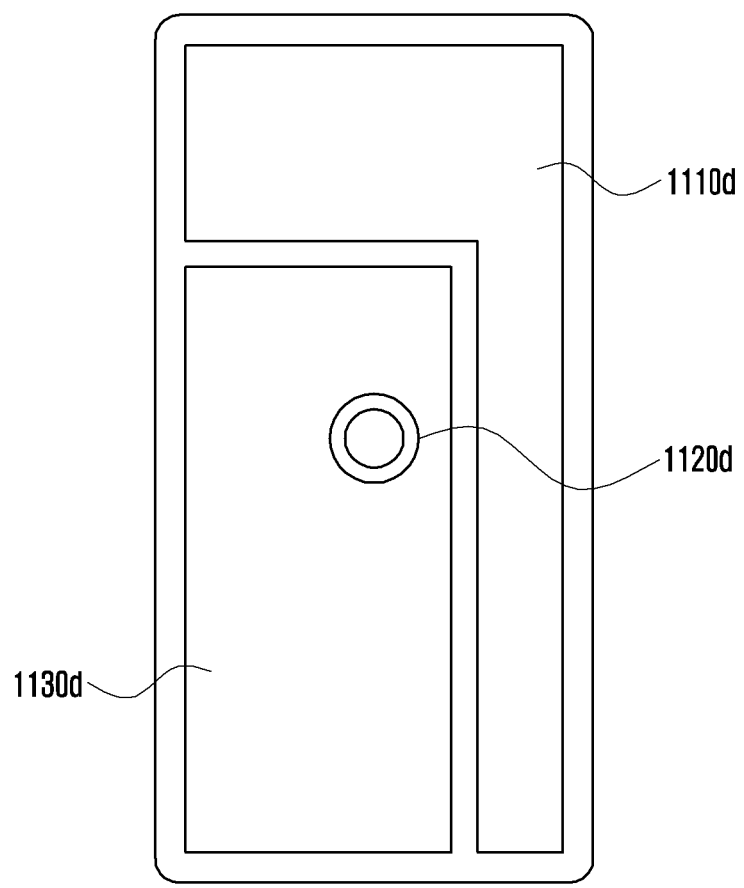

According to another embodiment, as shown in FIG. 11D, a hole that penetrates at least a portion of a battery 1130d may be formed, and at the hole, at least a portion of a sensor 1120d and/or at least a portion of an electrical structure (e.g., the electrical structure 728 of FIG. 7) may be disposed.

Figure 11E:
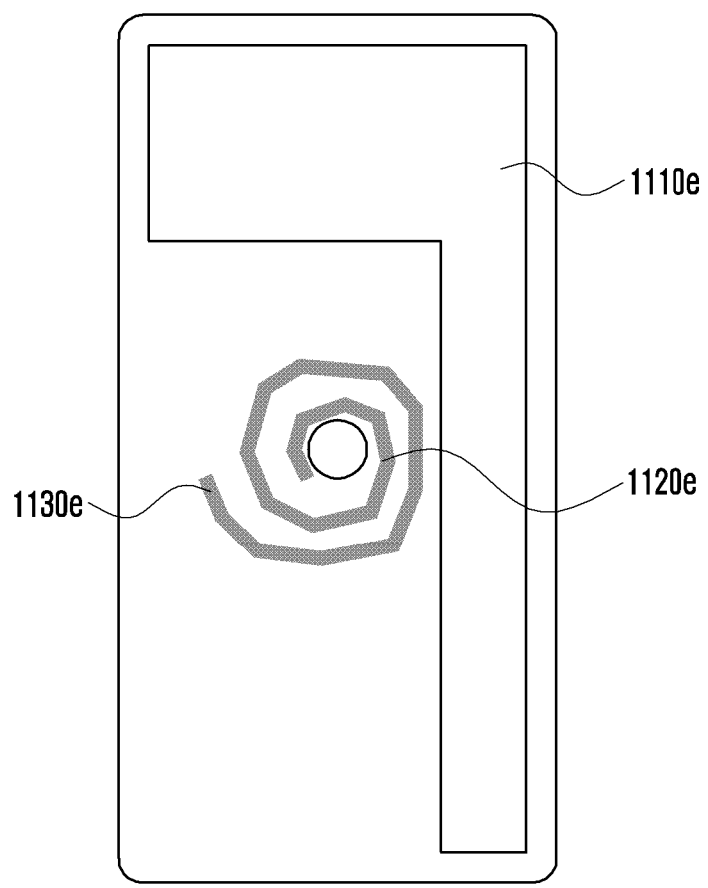

According to another embodiment, as shown in FIG. 11E, when using a battery 1130e of a roll structure, the battery 1130e may be disposed in a roll form about an area in which at least a portion of a sensor 1120e and/or at least a portion of an electrical structure (e.g., the electrical structure 728 of FIG. 7) are/is located.

Figure 11F:
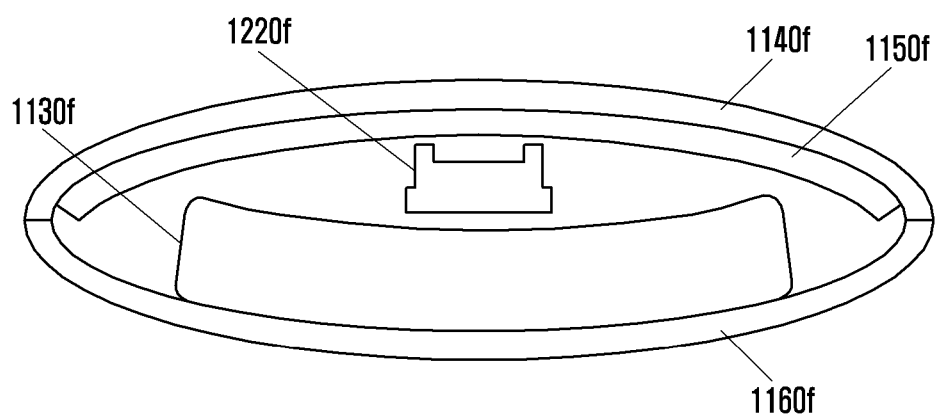

According to another embodiment, as shown in FIG. 11F, the electronic device includes a curved form of housing, and a window 1140f, a display 1150f, and a sensor 1120f may be sequentially disposed. A battery 1130f is disposed between a rear surface housing 1160f and the sensor 1120f and may be formed in a curved surface form along a curved surface of the rear surface housing 1160f. In the present embodiment, elements (not shown) such as an FPCB may be formed in a curved surface form along a curved surface of the rear surface housing 1160f.

Figure 11G:
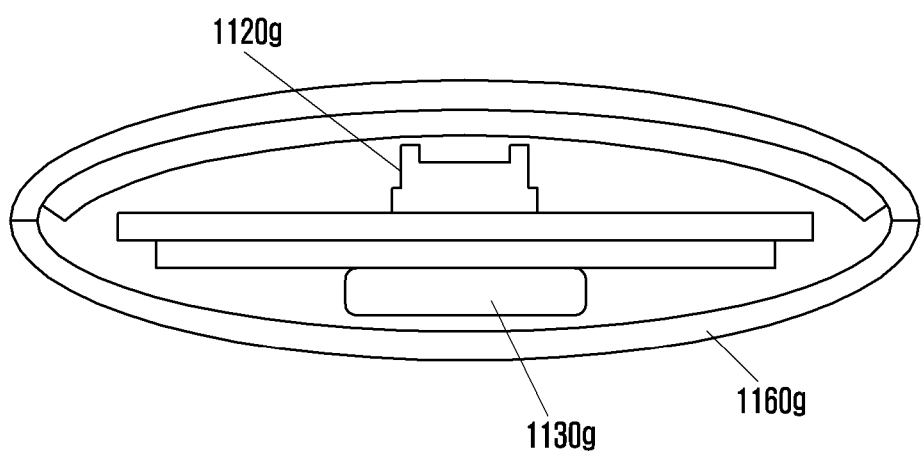

According to another embodiment, as shown in FIG. 11G, a battery 1130g is formed in a flat form to be provided between a sensor 1120g and a rear surface housing 1160g, and a predetermined gap may be formed between a flat form of battery 1130g and a curved surface form of rear surface housing 1160g.

Figure 12A:
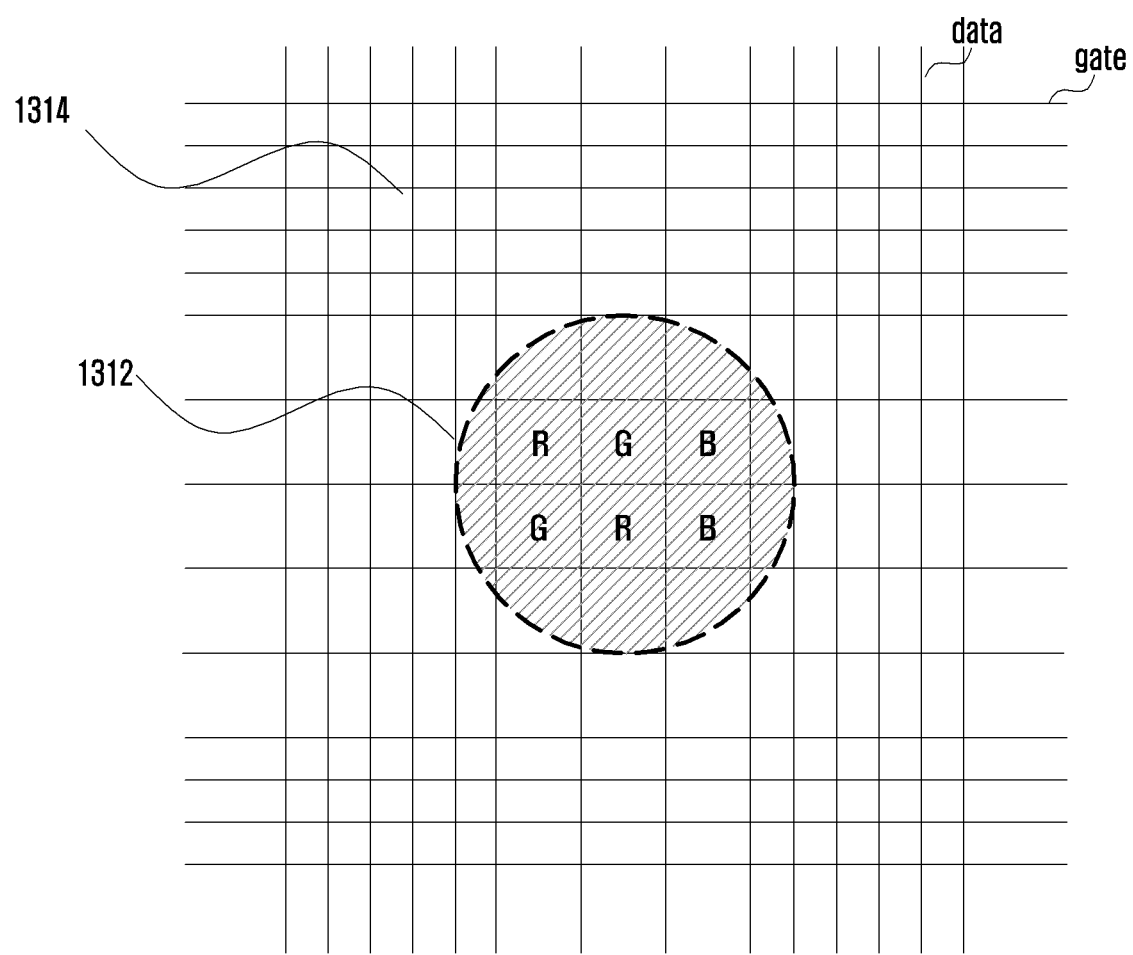
FIGS. 12A to 12C are diagrams illustrating a wiring form of a display according to various embodiments of the present disclosure.
Figure 12B:
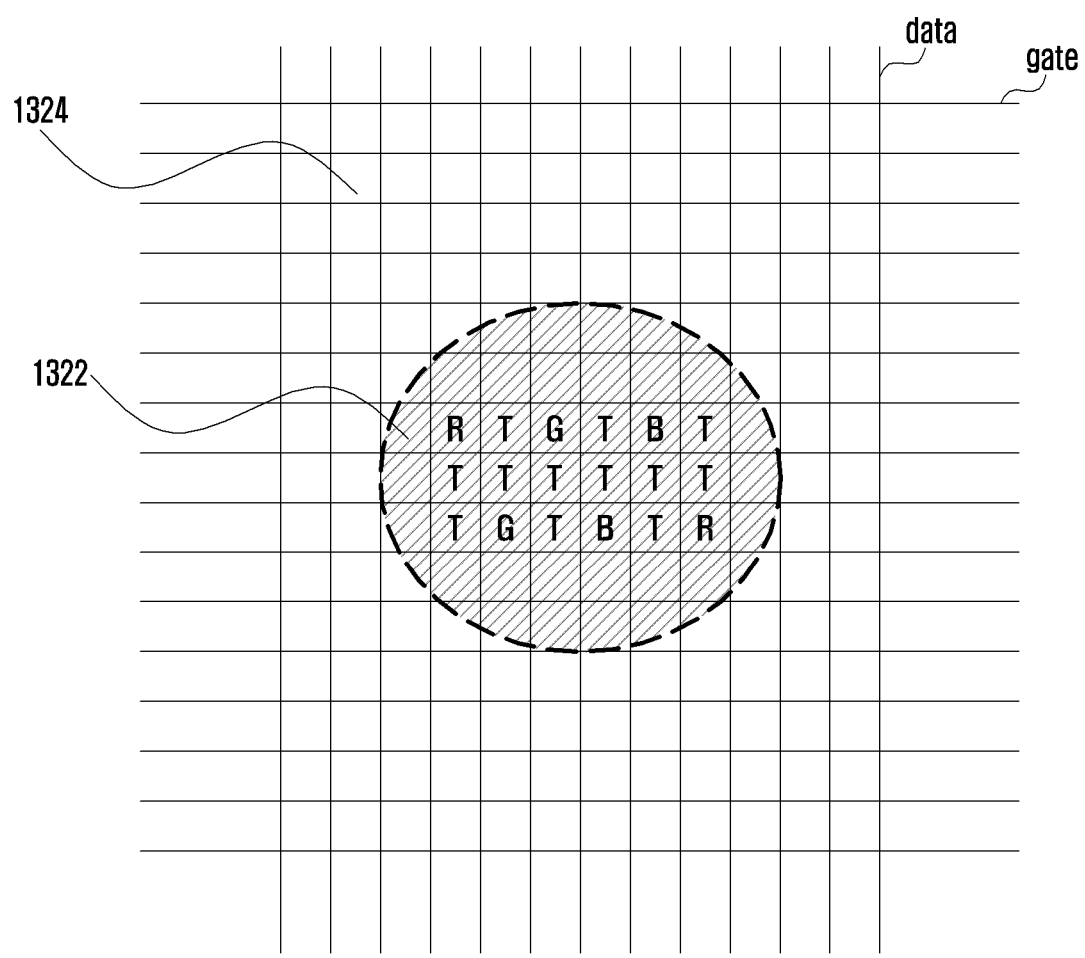
Figure 12C:
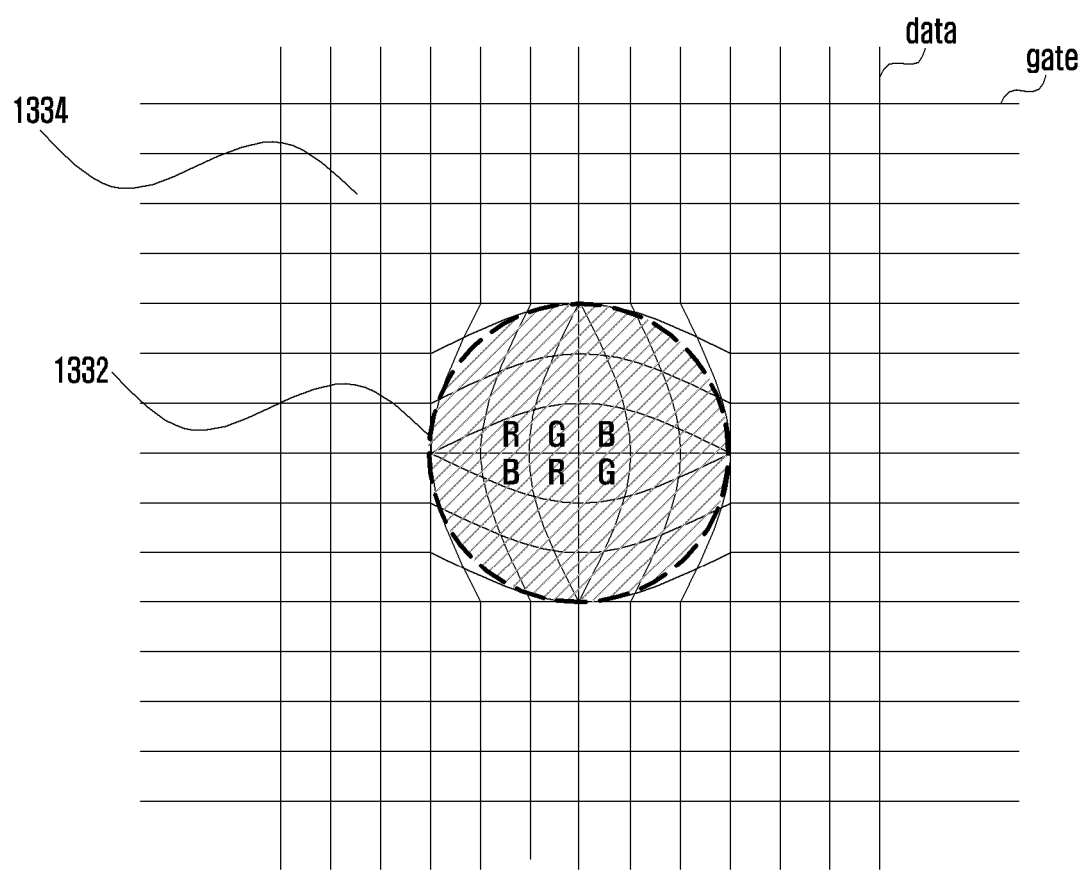

FIGS. 12A to 12C are diagrams illustrating a wiring form of a display according to various embodiments of the present disclosure. FIGS. 12A to 12C illustrate a case in which a display of an electronic device is implemented into an Organic Light Emitting Diode (OLED) display, but it is not always limited thereto.

An electronic device according to various embodiments of the present disclosure may dispose at least one sensor at a polarizer layer that may transmit light in a display and at a rear surface of a display upper plate and a display lower plate, and light occurring at the outside may be recognized by the sensor via the display. However, even if the display transmits light, light may not be transmitted by 100% by an element such as an electrode, an organic light emitting layer, and a thin film transistor. Therefore, an electronic device according to various embodiments of the present disclosure may increase a transmittance of light in an area in which the sensor is located on the display.

The display includes a plurality of gate wirings disposed in a horizontal direction and a plurality of data wirings disposed in a vertical direction, and the plurality of gate wirings and the plurality of data wirings may form a pixel in a matrix form. The gate wiring transfers a signal that scans each pixel to the each pixel, and the data wiring may transfer a signal related to image information to be displayed through each pixel to the each pixel.

According to various embodiments of the present disclosure, a display may include a first area including a first pixel having a first structure and a second area including a second pixel having a second structure, and the second structure may be different from the first structure. Here, the second area may correspond to an area in which the sensor is located on the display, and the first area may be the remaining areas in which the sensor is not located on the display.

As described above, a transmittance of the second area in which the sensor is located may be larger than that of the first area, and according to various embodiments, pixel per inch (ppi) of the second area may be smaller than that of the first area. Further, according to various embodiments, a form of a first gate wiring and/or a form of a first data wiring crossing a first area of the display may be different from that of a second gate wiring and/or that of a second data wiring crossing a second area of the display.

According to various embodiments, as shown in FIG. 12A, in a second area 1312 in which a sensor is located on the display, a gap between data wirings and a gap between gate wirings may be larger than that between data wirings and that between gate wirings of a first area 1314 in which a sensor is not located. Because the gate wiring and the data wiring can block and/or refract light, by reducing the number of the gate wiring and the data wiring by enlarging a gap between the gate wiring and the data wiring in the second area 1312, blocked and/or refracted light may be reduced. When a gap between the data wiring and the gate wiring is enlarged, in the second area 1312, a size of each of subpixels red (R), green (G), and blue (B) may be larger than that in the first area 1314, and pixel per inch (ppi) in the second area 1312 may be smaller than that in the first area 1314.

According to various embodiments, as shown in FIG. 12B, at least a portion of an area in which at least one pixel occupies on the display may be disposed with a transparent layer T. In each pixel, at least one Thin Film Transistor (TFT), storage capacitor, and organic light emitting diode may be disposed, and such elements may block and/or refract at least a portion of light.

In order to enhance a transmittance of light of a second area 1322, in the second area 1322 in which a sensor is located on the display, a transparent layer T may be disposed between subpixels R, G, and B, and in the transparent layer T, the TFT and an organic light emitting diode may be removed. Accordingly, a pixel size in the second area 1322 is the same as that in the first area 1324, but due to existence of the transparent layer T, pixel per inch (ppi) in the second area 1322 may be smaller than that in the first area 1324.

According to various embodiments, as shown in FIG. 12C, a gate wiring and a data wiring of a second area 1332 in which a sensor is located may be formed different from a gate wiring and a data wiring of a first area 1334. As shown in FIG. 12C, in the first area 1334, the entire of the gate wiring and the data wiring may be provided in a straight line, but a portion of the gate wiring and the data wiring within the second area 1332 may have a form refracted in an outer direction from the center of the second area 1332.

Accordingly, the number of gate wirings and data wirings passing through the second area 1332 may be reduced.

An electronic device according to various embodiments of the present disclosure may include a touch screen between a transparent substrate and a display or within the display, and the touch screen may be disposed in a form in which at least a portion of an electrode pattern included in the touch screen is removed. For example, in a second area, a portion of a touch screen electrode pattern may be removed. In this case, external light injected into a sensor through a second area of the display from the outside may not be refracted or scattered by the touch screen electrode pattern.

Figure 13A:
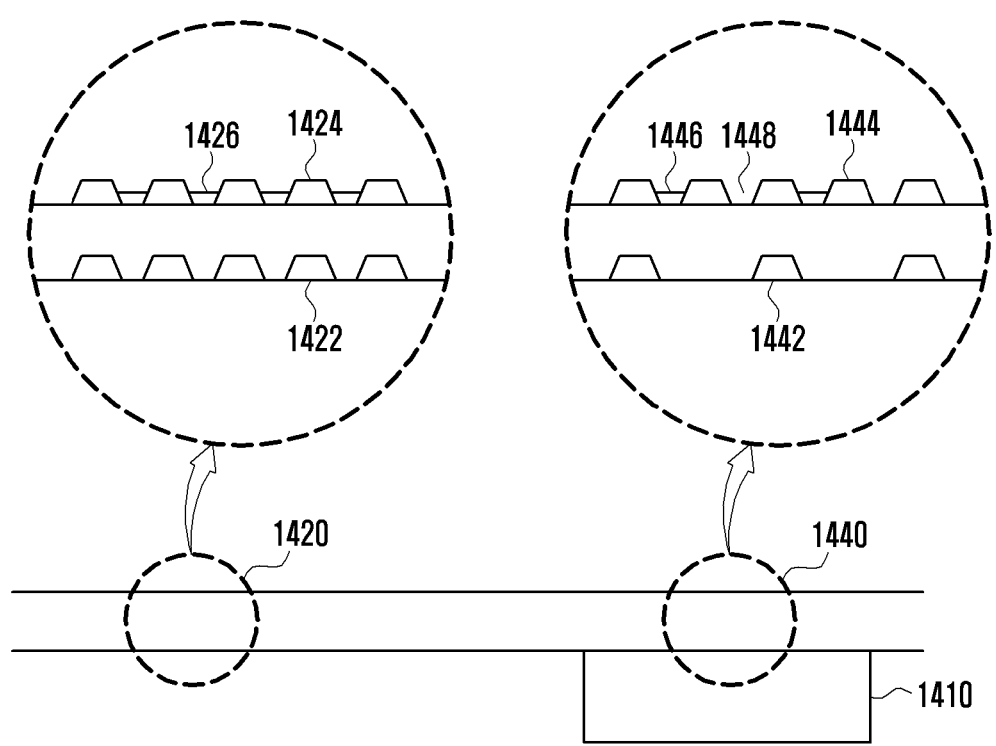
FIGS. 13A and 13B are side views illustrating a structure of a display according to various embodiments of the present disclosure.
Figure 13B:
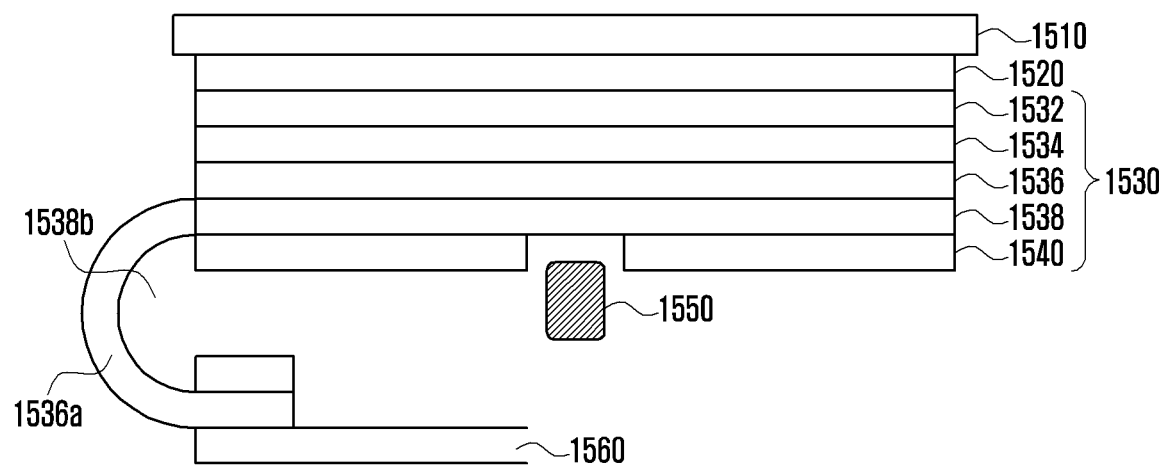

FIGS. 13A and 13B are side views illustrating a structure of a display according to various embodiments of the present disclosure.

Referring to FIG. 13A, a plurality of TFTs and a plurality of pixels may be formed between the display lower plate and the display upper plate.

When enlarging a first area 1420 in which the sensor is not located, TFTs 1422 are disposed at a predetermined gap, a plurality of pixel boundaries 1424 are disposed at a predetermined gap, and an organic light emitting diode 1426 may be provided between the pixel boundaries 1424. The organic light emitting diode may include a first electrode, second electrode, and organic light emitting material between the first electrode and the second electrode. For example, one of the first electrode or the second electrode may be formed with a transparent electrode, and the other one thereof may be formed with an opaque electrode.

According to an embodiment, in a second area 1440 in which the sensor is located, a plurality of TFTs 1442 may be disposed at a wider gap, compared with the first area 1420. In this case, a gap between a gate wiring and a data wiring electrically connected to the wider gap of TFT 1442 may be larger than that between the gate wiring and the data wiring of the first area 1420.

According to an embodiment, some pixel area divided by each pixel boundary 1444 may be formed with a transparent layer 1448 in which at least a portion of the organic light emitting diode is removed. For example, a transparent layer 1448 may have a form in which an opaque electrode of a first electrode and a second electrode is removed with an organic light emitting material interposed therebetween or may have a form in which the entire of a first electrode, a second electrode, and an organic light emitting material disposed therebetween is removed. For example, the transparent layer 1448 may have a small thickness by a thickness of at least one of the first electrode, the second electrode, and/or the organic light emitting material, compared with a portion in which the organic light emitting diode is disposed. The display may further include a planarization layer (not shown) that planarizes a height of a portion in which the organic light emitting diode is disposed and a portion whose at least a portion is removed.

Referring to FIG. 13B, a transparent substrate 1510, touch screen 1520, display 1530, and protective layer 1540 may be sequentially layered, and in an area in which at least a portion of the protective layer 1540 is removed, a sensor 1550 may be provided. The display 1530 may include a display upper plate, organic light emitting diode 1534, and display lower plate. For example, the display upper plate may include an encapsulation layer 1532 for blocking moisture and air injected into the display, and the encapsulation layer 1532 may be formed in one layer or may have a form in which an organic material and an inorganic material are repeatedly layered. The display lower plate may include a first polymer layer 1536 and a second polymer layer 1538.

According to an embodiment, the display lower plate may have a form in which at least a portion thereof is bent. For example, the display lower plate may have a bent form in an inactive area in which an organic light emitting diode is not disposed. For example, in a portion of a bent portion 1536a of the display lower plate, an FPCB 1560 may be disposed, and on the FPCB 1560, a Display Driver Integrated Circuit (DDIC) may be disposed. For example, traces electrically connected between the gate wiring or the data wiring of the display and the DDIC may be disposed in other portions of a bent portion of the display lower plate. For example, the traces may be made of at least one of titanium (Ti), copper (Cu), aluminum (Al), and molybdenum (Mo). The display lower plate may be formed with a flexible polymer film and may include polyimide, PET, or other polymer material. For example, the display lower plate may be formed with a double layer of the first polymer layer 1536 (e.g., polyimide) and the second polymer layer 1538 (e.g., PET), at least a portion of the first polymer layer 1536 may include a bent portion 1536a, and at the lower end of the bent portion 1536a of the first polymer layer, a form 1538b in which at least a portion of the second polymer layer (e.g., PET) is removed may be formed.

An electronic device according to various embodiments of the present disclosure may include at least one of a pressure sensor, fingerprint sensor, or antenna integrated with a display or a touch screen. For example, at least one of the pressure sensor, fingerprint sensor, or antenna may be disposed between a transparent substrate and a display and may include at least one electrode layer. For example, at least one electrode layer may be directly formed at a surface of a second direction of a transparent substrate or a surface of a first direction of the display or may be formed at a separate film to be attached to the transparent substrate or the display. For example, at least one electrode layer may be disposed within the display. In this case, at least one electrode layer may be disposed between an upper plate and a lower plate of the display and may be disposed between other electrodes for driving the display. According to an embodiment, at least one of a pressure sensor control circuit, fingerprint sensor control circuit, and communication circuit may be integrated with a DDIC. The integrated circuit may be formed in a Flexible Printed Circuit Board. For example, at least two signals of a first signal generated in the integrated circuit and transmitted to the display, a second signal transmitted to a pressure sensor, a third signal transmitted to a fingerprint sensor, and a fourth signal transmitted to an antenna may be transmitted for different time segments. At least two signals of the first signal, second signal, third signal, and fourth signal may be an inverted signal. At least one of the pressure sensor control circuit, fingerprint sensor control circuit, and communication circuit may not be integrated with the DDIC.

According to various embodiments of the present disclosure, an electronic device includes a housing including a first surface facing in a first direction and a second surface facing in a second direction opposite to the first direction and including a transparent substrate forming at least a portion of the first surface thereof; a display disposed between the transparent substrate and the second surface of the housing and including a first surface facing in the first direction and a second surface facing in the second direction; at least one sensor disposed between at least a portion of the second surface of the display and at least a portion of the second surface of the housing; an electrical structure disposed between the at least one sensor and at least a portion of the second surface of the housing; and a control circuit electrically connected to the electrical structure, wherein the control circuit detects an electrical signal occurring or changing within the electrical structure by a pressure of the second direction to at least a portion of the transparent substrate using the electrical structure.

According to various embodiments, the at least one sensor may include at least one of a camera, proximity sensor, illumination sensor, fingerprint detection sensor, and bio sensor.

According to various embodiments, the electrical structure may include: a conductive member separated in the second direction from the at least one sensor; and a conductive dome structure disposed between at least a portion of the at least one sensor and at least a portion of the conductive member, wherein the control circuit may detect an electrical signal generated by a contact of at least a portion of the conductive dome structure and the conductive member by the pressure.

According to various embodiments, the electrical structure may include: a first electrode that at least partially contacts with the at least one sensor; and a second electrode that at least partially contacts with the first electrode, wherein the control circuit may detect a change of an amount of a current flowing through the first electrode and the second electrode as a change of the electrical signal.

According to various embodiments, the electrical structure may include: a light emitting structure that emits light; and a light receiving structure that receives at least a portion of light emitted from the light emitting structure, wherein the control circuit may detect at least one of a time in which light emitted from the light emitting structure arrives at the light receiving structure and an amount of light received at the light receiving structure as a change of the electrical signal.

According to various embodiments, the electrical structure may include a first electrode and a second electrode separately disposed from the first electrode, and the control circuit may detect a change of a capacitance formed between the first electrode and the second electrode as a change of the electrical signal.

According to various embodiments, the electronic device may further include: a processor electrically connected to the control circuit and the display and a memory electrically connected to the processor, wherein the processor may enable to display a first screen on the display, when the memory is executed and store an instruction that enables to convert the first screen to a second screen in which a plurality of icons corresponding to a plurality of applications are disposed in response to the detection.

According to various embodiments, the display may include: a first area whose at least a portion is not overlapped with the at least one sensor, when viewing from the top of the transparent substrate; and a second area whose at least a portion is overlapped with the at least one sensor, when viewing from the top of the transparent substrate.

According to various embodiments, the first area of the display may include a first pixel having a first structure, and the second area of the display may include a second pixel having a second structure.

According to various embodiments, a transmittance of the second area of the display may be greater than that of the first area of the display.

According to various embodiments, pixel per inch (ppi) of the second area of the display may be smaller than that of the first area of the display.

According to various embodiments, the display may include a gate wiring that transfers a first signal to at least one of the first pixel and the second pixel and a data wiring that transfers a second signal to the at least one of the first pixel and the second pixel, and at least one of a form of a first gate wiring and a form of a first data wiring crossing the first area of the display may be different from at least one of a form of a second gate wiring and a form of a second data wiring crossing the second area of the display.

According to various embodiments, the electronic device may further include a touch screen disposed between the transparent substrate and the display or disposed within the display, wherein the touch screen may include: a first touch electrode pattern disposed between the transparent substrate and the first area of the display; and a second touch electrode pattern disposed between the transparent substrate and the second area of the display.

According to various embodiments, the second touch electrode pattern may have a form in which at least a portion of the first touch electrode pattern is removed.

According to various embodiments, the display may include an active area including an organic light emitting diode and an inactive area that does not include an organic light emitting diode, and at least a portion of the inactive area of the display may be folded in the second direction.

According to various embodiments, the electronic device may further include a Display Driver Integrated Circuit (DDIC) electrically connected to the display, and the DDIC may be disposed in at least a portion folded in the second direction.

According to various embodiments, the display may include a first polymer layer and a second polymer layer attached to a surface facing in the second direction of the first polymer layer, wherein the second polymer layer may be at least partially removed from at least a portion folded in the second direction.

According to various embodiments, the electronic device may further include: a pressure sensor disposed between the second surface of the display and the second surface of the housing; and another control circuit electrically connected to the pressure sensor, wherein the another control circuit may detect a pressure level of the second direction using the pressure sensor.

According to various embodiments, the electronic device may further include at least one of a fingerprint sensor and an antenna, and at least one of the fingerprint sensor and the antenna may be disposed between the transparent substrate and the display or may be disposed within the display.

According to various embodiments of the present disclosure, an electronic device includes a housing including a first surface facing in a first direction and a second surface facing in a second direction opposite to the first direction and including a transparent substrate forming at least a portion of the first surface thereof; a display disposed between the transparent substrate and the second surface of the housing and including a first surface facing in the first direction and a second surface facing in the second direction; a camera device disposed between at least a portion of the second surface of the display and at least a portion of the second surface of the housing; a member separately disposed in the second direction from the camera device; an electrical structure disposed between the camera device and the member; and a control circuit electrically connected to the electrical structure, wherein the control circuit detects an electrical signal occurring or changing within the electrical structure by a change of a distance between the camera device and the member according to a movement in the second direction of the camera device using the electrical structure.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. An electronic device, comprising:
a housing comprising a first surface facing in a first direction and a second surface facing in a second direction opposite to the first direction and comprising a transparent substrate forming at least a portion of the first surface;
a display disposed between the transparent substrate and the second surface of the housing and comprising a third surface facing in the first direction and a fourth surface facing in the second direction;
a protective layer disposed between the display and the second surface of the housing and configured to block light emitted in the second direction, wherein a hole is formed in which at least a portion of the protective layer is removed;
a sensor configured to receive external light passing through at least a part of the transparent substrate and the display and to be disposed between at least a portion of the fourth surface of the display and at least a portion of the second surface of the housing;
an electrical structure disposed between the sensor and at least a portion of the second surface of the housing; and
a control circuit electrically connected to the electrical structure,
wherein the control circuit is configured to detect an electrical signal occurring or changing within the electrical structure by a pressure of the second direction to at least a portion of the transparent substrate using the electrical structure,
at least a portion of the sensor is disposed in the hole formed in the protective layer and one surface of the sensor contacts with the fourth surface of the display, and
when the pressure of the second direction on the at least a portion of the transparent substrate is occurred, at least part of the of the display and the sensor is moved to the second direction and the electrical structure is configured to generate the electrical signal based on the movement of the sensor.

2. The electronic device of claim 1, wherein the sensor comprises at least one of a camera, proximity sensor, illumination sensor, fingerprint detection sensor, or bio sensor.

3. The electronic device of claim 1, wherein the electrical structure comprises:

a conductive member separated in the second direction from the sensor; and
a conductive dome structure disposed between at least a portion of the sensor and at least a portion of the conductive member,
wherein the control circuit is configured to detect the electrical signal generated by a contact of at least a portion of the conductive dome structure and the conductive member by the pressure.

4. The electronic device of claim 1, wherein the electrical structure comprises:
a first electrode that at least partially contacts with the sensor; and
a second electrode that at least partially contacts with the first electrode,
wherein the control circuit is configured to detect a change of an amount of a current or resistance or a voltage in at least a portion of the first electrode or the second electrode as a change of the electrical signal using the first electrode or the second electrode.

5. The electronic device of claim 1, wherein the electrical structure comprises:
a light emitting structure that emits light; and
a light receiving structure that receives at least a portion of light emitted from the light emitting structure,
wherein the control circuit is configured to detect at least one of a time in which light emitted from the light emitting structure arrives at the light receiving structure or an amount of light received at the light receiving structure as a change of the electrical signal.

6. The electronic device of claim 1, wherein the electrical structure comprises a first electrode and a second electrode separately disposed from the first electrode, and
wherein the control circuit is configured to detect a change of a capacitance formed between the first electrode and the second electrode as a change of the electrical signal.

7. The electronic device of claim 1, wherein the electronic device further comprises:
a processor electrically connected to the control circuit and the display and a memory electrically connected to the processor,
wherein the processor is configured to enable the display to display a first screen when the memory is executed, and store an instruction for converting the first screen to a second screen in which a plurality of icons corresponding to a plurality of applications are disposed in response to the detection of the electrical signal by the control circuit.

8. The electronic device of claim 1, wherein the display comprises:
a first area comprising at least a portion that is not overlapped with the sensor, when viewing from a top of the transparent substrate; and
a second area comprising at least a different portion that is overlapped with the sensor, when viewing from the top of the transparent substrate.

9. The electronic device of claim 8, wherein the first area of the display comprises a first pixel having a first structure, and
the second area of the display comprises a second pixel having a second structure.

10. The electronic device of claim 9, wherein the display comprises a gate wiring that transfers a first signal to at least one of the first pixel or the second pixel and a data wiring that transfers a second signal to at least one of the first pixel or the second pixel, and at least one of a form of a first gate wiring and a form of a first data wiring crossing the first area of the display is different from at least one of a form of a second gate wiring and a form of a second data wiring crossing the second area of the display.

11. The electronic device of claim 8, wherein a transmittance of the second area of the display is greater than a transmittance of the first area of the display.

12. The electronic device of claim 8, wherein a pixel per inch (ppi) of the second area of the display is smaller than a ppi of the first area of the display.

13. The electronic device of claim 8, wherein the electronic device further comprises a touch screen disposed between the transparent substrate and the display or disposed within the display, wherein the touch screen comprises:
- a first touch electrode pattern disposed between the transparent substrate and the first area of the display; and
- a second touch electrode pattern disposed between the transparent substrate and the second area of the display.

14. The electronic device of claim 13, wherein the second touch electrode pattern has a form in which at least a portion of the first touch electrode pattern is removed.

15. The electronic device of claim 1, wherein the display comprises an active area comprising an organic light emitting diode and an inactive area that does not comprise an organic light emitting diode, and
- at least a portion of the inactive area of the display is folded in the second direction.

16. The electronic device of claim 15, wherein the electronic device further comprises a Display Driver Integrated Circuit (DDIC) electrically connected to the display, and
- wherein the DDIC is disposed in at least the portion of the inactive area of the display folded in the second direction.

17. The electronic device of claim 15, wherein the display comprises a first polymer layer and a second polymer layer attached to a surface facing in the second direction of the first polymer layer,
- wherein the second polymer layer is at least partially removed from at least the portion of the inactive area of the display folded in the second direction.

18. The electronic device of claim 1, wherein the electronic device further comprises:
- a pressure sensor disposed between the second surface of the display and the second surface of the housing; and
- another control circuit electrically connected to the pressure sensor,
- wherein the another control circuit is configured to detect a pressure level of the second direction using the pressure sensor.

19. The electronic device of claim 1, wherein the electronic device further comprises at least one of a fingerprint sensor and an antenna, and
- at least one of the fingerprint sensor and the antenna is disposed between the transparent substrate and the display or is disposed within the display.

* * * * *